(12) United States Patent
Yamada et al.

(10) Patent No.: US 7,747,616 B2
(45) Date of Patent: Jun. 29, 2010

(54) FILE SEARCH METHOD AND SYSTEM THEREFOR

(75) Inventors: Shigefumi Yamada, Morgantown, WV (US); Takahiro Matsuda, Isehara (JP); Takashi Morihara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 11/477,623

(22) Filed: Jun. 30, 2006

(65) Prior Publication Data

US 2007/0162431 A1      Jul. 12, 2007

(30) Foreign Application Priority Data

Jan. 10, 2006   (JP)   ............... 2006-002368

(51) Int. Cl.
  *G06F 17/30*   (2006.01)
(52) U.S. Cl. ..................................... 707/723
(58) Field of Classification Search ........................ None
  See application file for complete search history.

(56) References Cited

U.S. PATENT DOCUMENTS

| 2003/0229858 | A1* | 12/2003 | Keohane et al. ............. 715/526 |
| 2005/0144162 | A1* | 6/2005 | Liang ............................. 707/3 |

FOREIGN PATENT DOCUMENTS

| JP | 01-149127 | 6/1989 |
| JP | 03-278175 | 12/1991 |
| JP | 2001-147936 | 5/2001 |
| JP | 2002-099568 | 4/2002 |
| JP | 2004-206631 | 7/2004 |
| WO | 2004/031956 A1 | 4/2004 |

OTHER PUBLICATIONS

The PageRank Citation Ranking: Bringing Order to the Web Jan. 29, 1998 pp. 1-17.
Alexander Ames et al., "Richer File System Metadata Using Links and Attributes", Mass Storage Systems and Technologies, 2005. Proceedings. $22^{nd}$ IEEE/$13^{th}$ NASA Goddard Conference on Monterey, CA, Apr. 11, 2005, pp. 49-60.
Yoann Padioleau et al., "A Logic File System", Proceedings of the USENIX Annual Technical Conference, Jun. 9, 2003, pp. 99-112.
David K. Gifford et al., "Semantic File Systems", ACM, 1991, pp. 16-25.
Extended European Search Report, mailed Dec. 18, 2006 and issued in corresponding European Patent Application No. 06116607.0-2201.

* cited by examiner

*Primary Examiner*—Mohammad Ali
*Assistant Examiner*—Syed H Hasan
(74) *Attorney, Agent, or Firm*—Staas & Halsey LLP

(57) ABSTRACT

According to the present invention, there are provided a file search method and a system therefor with which it is possible to display files including a keyword specified by a user in an importance descending order by monitoring a file operation by the user, creating reference relation between files, and arranging search results on the basis of the importance calculated from the reference relation.

15 Claims, 37 Drawing Sheets

|  | REFERENCE FILE | REFERENCE SOURCE FILE | USER | DATE AND TIME | COPY & PASTE | REFERENCE TIME | |
|---|---|---|---|---|---|---|---|
| Reference Relation 1 | File B | File A | User A | 2005/6/10 13:10 | 6 | 6 minutes and 36 seconds | ⋮ |
| Reference Relation 2 | File C | File A | User B | 2005/6/10 20:44 | 1 | 1 minute and 27 seconds | ⋮ |
| Reference Relation 3 | File D | File B | User C | 2005/6/10 21:00 | 2 | 4 minutes and 14 seconds | ⋮ |
| Reference Relation 4 | File B | File C | User C | 2005/6/22 21:27 | 3 | 8 minutes and 43 seconds | ⋮ |
| Reference Relation 5 | File T | File C | User C | 2005/6/22 21:31 | 1 | 5 minutes and 58 seconds | ⋮ |

FIG. 3A

|  | REFERENCE FILE | REFERENCE SOURCE FILE | IMPORTANCE | USER | DATE AND TIME | COPY & PASTE | REFERENCE TIME | |
|---|---|---|---|---|---|---|---|---|
| Reference Relation 75 | File B | File A | 24 | User A | 2005/7/14 15:13 | 3 | 4 minutes and 32 seconds | ... |
| Reference Relation 76 | File C | File A | 69 | User F | 2005/7/14 16:41 | 3 | 3 minutes and 53 seconds | ... |
| Reference Relation 77 | File D | File B | 326 | User I | 2005/7/15 12:37 | 4 | 5 minutes and 24 seconds | ... |

FIG. 3B

| USER | WEIGHT |
|------|--------|
| User A | Wa |
| User B | Wb |
| User C | Wc |

FIG. 3C

INPUT KEYWORD :

[********]

INPUT LOGIN NAME :

[********]

SELECT ITEM :

☐ IMPORTANCE

● WEIGHT SETTING RULE

☐ NO USE

FIG. 30

FILE SEARCH METHOD AND SYSTEM THEREFOR

BACKGROUND OF THE INVENTION

1. Field of the Invention

The present invention relates to a file search method of searching for a file with high relevance to a file which a user desires to obtain, and a system therefore. In particular, the invention relates to a file search method of searching for a file which a user desires to obtain among an enormous number of files stored in a user terminal device or a file server, and a system therefore.

2. Description of the Related Art

In consequence of the spread of the network environment including information devices and the Internet, a user has a large number of electronic files such as documents and images stored in a user terminal device or a file server. When the user tries to find out a desired file from the great number of files, a keyword is input to perform a search. In such a search, all the files including the keyword are displayed as the search results. Thus, the user searches for the desired file among the many search results.

Up to now, various techniques have been proposed for instantly finding out a desired file when the user performs a search.

For example, Japanese Unexamined Patent Application Publication No. 2001-147936 discloses a system for assigning a relevant value indicating the degree of relevance between documents in terms of citing and cited relation for the respective documents to search for a document on the basis of the assigned relevant value.

In addition, for example, Japanese Unexamined Patent Application Publication No. 2004-206631 discloses a system for registering a value in a database (DB) as the importance and performing a search on the basis of the importance. The value is obtained by setting information indicating the number of appearing times of a certain word in a document to be reflected by the characteristic amount as a weight based on the appearing status of the certain word in a document group.

According to the above-mentioned conventional search systems, for document files on which a cited document such as a patent document is described, a citation relation between document files is extracted by analyzing the description of the cited document to calculate the importance of each document file on the basis of the citation relation. When a file, in which the conventional search system is locally employed, is used as a search target, a description for performing the association in the document file is required. However, no citation description generally exists in the file in which the search system is locally employed, and thus such search systems cannot be applied to many files. Furthermore, as the citation relation depends on the description method, it is difficult to automatically extract the citation description.

SUMMARY OF THE INVENTION

Accordingly, it is an object of the present invention to provide a file search method capable of achieving the realization of instantly searching for a file which a user desires to obtain in the case of searching for files stored in a user terminal device or a file server, and a system therefore.

According to a first aspect of the present invention, there is provided a file search system for searching for a file stored in a storage device, including: reception means for receiving a search request made by a user; search means for obtaining a search result file on the basis of notification from the reception means; monitor means for monitoring a file operation by the user; creation means for creating a reference relation of the file on the basis of a monitor result of the monitor means; storage means for storing the reference relation; importance calculation means for calculating an importance of the file on the basis of the reference relation; and search result sort means for arranging the search result files obtained by the search means on the basis of the importance. As a result, it is possible to provide the file search system for displaying the search results on the basis of the importance of the file, which is calculated on the basis of the file operation by the user.

Also, according to the present invention, the file search system may further include weight setting means for setting a weight of the reference relation, in which the importance calculation means calculates the importance of the file on the basis of the weight set by the weight setting means. As a result, it is possible to provide the file search system for calculating the importance on the basis of the weight set by the user.

Also, according to the present invention, the file search system may further include weight setting rule obtaining means for obtaining a weight setting rule for setting the weight of the reference relation, in which: the storage means further stores the weight setting rule; and the importance calculation means calculates the importance of the file on the basis of the weight setting rule obtained by the weight setting means. As a result, it is possible to provide the file search system for calculating the importance on the basis of the weight setting rule selected by the user.

Also, according to the present invention, the file search system may further include: weight setting rule obtaining means for obtaining a weight setting rule for setting the weight of the reference relation; identification means for identifying the user; and recording means for recording the weight setting rule in association with each user, in which the importance calculation means calculates the importance on the basis of the weight setting rule associated with the user who has made the search request. As a result, it is possible to provide the file search system for calculating the importance on the basis of the weight setting rule associated with each user.

Also, according to the present invention, the file search system may further include: importance obtaining means for obtaining the importance; identification means for identifying the user; and recording means for recording the importance in association with each user, in which the search result sort means arranges the search result files obtained by the search means on the basis of the importance associated with the user who has made the search request. As a result, it is possible to provide the file search system for calculating the importance on the basis of the importance associated with each user.

Also, according to the present invention, the file search system may further include a control section for displaying a screen for allowing the user to select arrangement of the search result files obtained by the search means on the basis of the importance or a condition other than the importance, in which: the control section judges whether or not the user selects the arrangement of the search result files on the basis of the importance; and the search result sort means arranges the search result files on the basis of the importance if the arrangement of the search result files on the basis of the importance is selected and arranges the search result files on the basis of the condition other than the importance if the arrangement of the search result files on the basis of the importance is not selected. As a result, it is possible to provide the file search system in which the arrangement of the search results on the basis of the importance or the condition other than the importance can be instantly selected when the user makes the search request.

According to a second aspect of the present invention, there is provided a file search method of searching for a file stored in a storage device, including the steps of: receiving a search request made by a user; obtaining search result files by searching the storage device on the basis of the search request; monitoring a file operation by the user; creating a reference relation between files on the basis of the result of monitoring the file operation; storing the reference relation; calculating an importance of the file on the basis of the reference relation; and arranging the search result files on the basis of the importance. As a result, it is possible to provide the file search method of displaying the search results on the basis of the importance of the file, which is calculated on the basis of the file operation by the user.

Also, according to the present invention, the file search method may further include the steps of: setting a weight of the reference relation; and calculating the importance of the file on the basis of the weight set in the weight setting step. As a result, it is possible to provide the file search method of calculating the importance on the basis of the weight set by the user.

Also, according to the present invention, the file search method may further include the steps of: obtaining a weight setting rule for setting a weight of the reference relation; and calculating the importance of the file on the basis of the weight setting rule. As a result, it is possible to provide the file search method of calculating the importance on the basis of the weight setting rule selected by the user.

Also, according to the present invention, the file search method may further include the steps of: obtaining a weight setting rule for setting a weight of the reference relation; identifying the user; recording the weight setting rule in association with each user; and calculating the importance on the basis of the weight setting rule associated with the user who has made the search request. As a result, it is possible to provide the file search method of calculating the importance on the basis of the weight setting rule associated with each user.

Also, according to the present invention, the file search method may further include the steps of: obtaining the importance; identifying the user; recording the importance in association with each user; and arranging the search result files on the basis of the importance associated with the user who has made the search request. As a result, it is possible to provide the file search method of calculating the importance on the basis of the importance associated with each user.

Also, according to the present invention, the file search method may further include the steps of: displaying a screen for allowing the user to select arrangement of the search result files on the basis of the importance or a condition other than the importance; judging whether or not the user selects the arrangement of the search result files on the basis of the importance; and arranging the search result files on the basis of the importance when the arrangement of the search result files on the basis of the importance is selected and arranging the search result files on the basis of the condition other than the importance when the arrangement of the search result files on the basis of the importance is not selected. As a result, it is possible to provide the file search method with which the arrangement of the search results on the basis of the importance or the condition other than the importance can be instantly selected when the user makes the search request.

According to the present invention, it is possible to display the files including a keyword specified by the user in an importance descending order by monitoring the file operation by the user, creating reference relation between files, and arranging the search results on the basis of the importance calculated from the reference relation.

BRIEF DESCRIPTION OF THE DRAWINGS

FIGS. 3A and 3B show examples of reference relation and FIG. 3C shows an example of reference relation weight setting;

FIG. 30 shows an example of a screen for specifying the importance or the like associated with a user.

DESCRIPTION OF THE PREFERRED EMBODIMENTS

Hereinafter, a description will be given of embodiments of the present invention with reference to the accompanying drawings.

First Embodiment

It is conceivable that the present invention may have the configuration to be mounted to a user terminal device alone, or to a file server and a user terminal device connected to the file server.

Figure 1:
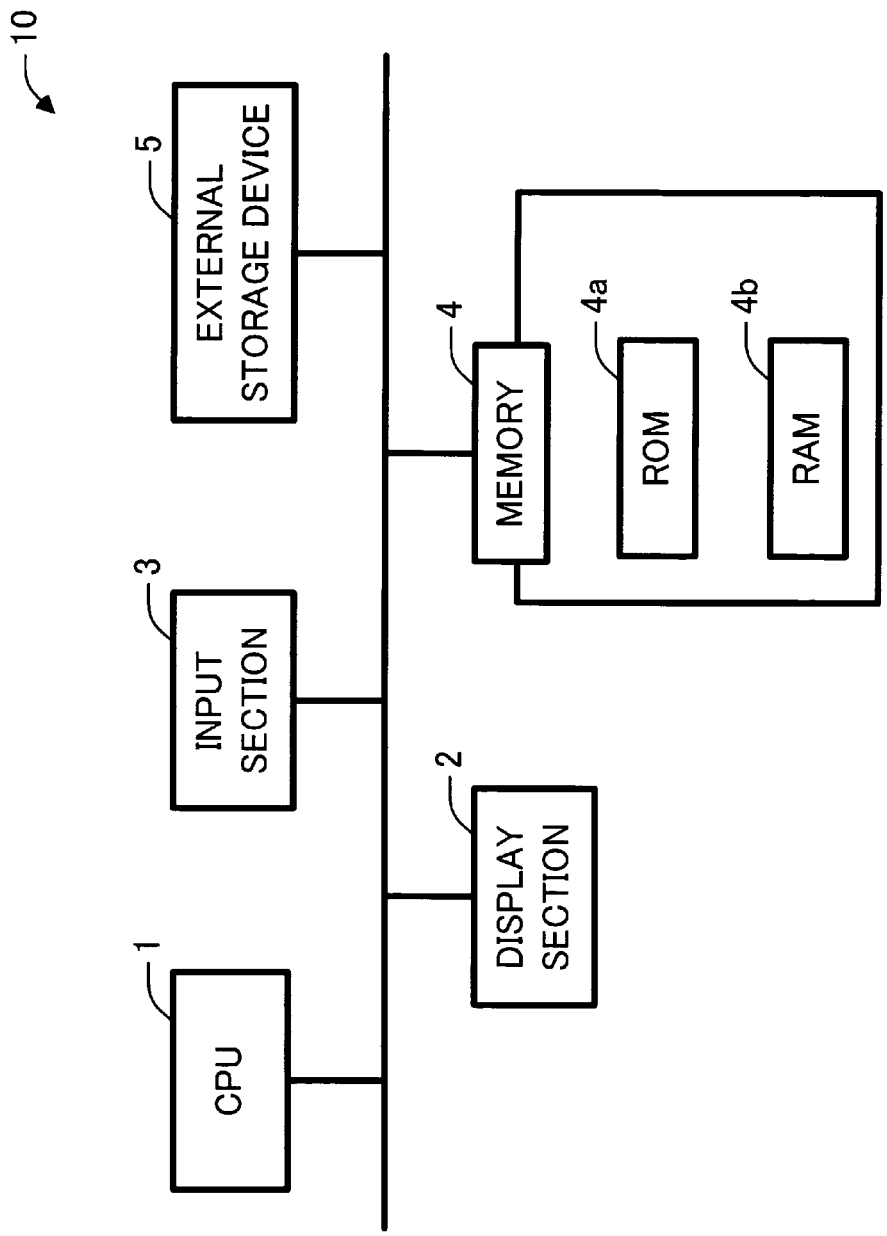
FIG. 1 is a block diagram for schematically describing an example of a hardware configuration of a user terminal device.

FIG. 1 is a block diagram for schematically showing an example of a hardware configuration where a user terminal device alone is mounted. In a user terminal device 10, a display section 2 having a display screen such as a liquid crystal screen, an input section 3 for performing input of data or the like by the user, a memory 4 for performing execution of a program and storage of the data, and an external storage device 5 for storing a program for executing a file search method are connected to a CPU 1. The CPU 1 controls the above-mentioned sections. Furthermore, the memory 4 includes a ROM 4a for storing various programs of an operating system (OS) or the like and a RAM 4b used to temporally store data and perform execution of the program and processing of information.

Figure 2:
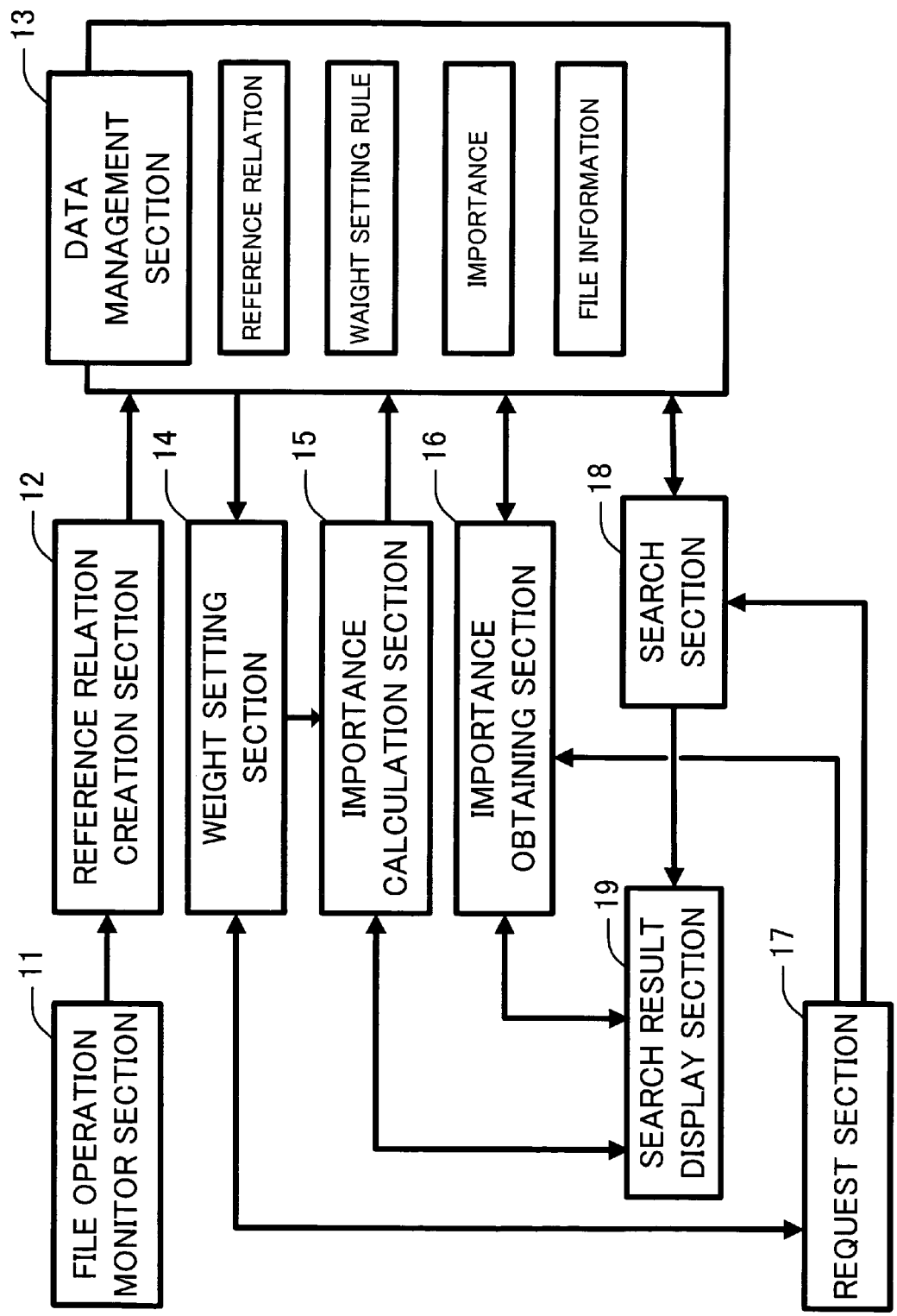
FIG. 2 is a block diagram for schematically describing a document search system.

FIG. 2 is a block diagram for schematically showing an example of a configuration of the file search method according to the first embodiment. A file operation monitor section 11 monitors a file operation by the user. When the file operation is generated, the operation content is analyzed to check whether or not a file in reference relation to the corresponding file exists. When the file in the reference relation exists, a reference relation creation section 12 obtains information such as a reference source file, a reference file, a user who has performed the file operation, and date and time when the file operation was performed, from the file operation content. A weight setting section 14 sets a weight of the reference relation which is used by an importance calculation section 15. The importance calculation section 15 obtains all the reference relations from a data management section 13 to calculate the importance for all the files managed as reference files on the basis of the reference relation. An importance obtaining section 16 obtains the importance stored in the data management section 13. The data management section 13 stores information being associated as the reference relation. A request section 17 receives a search request or the like from the user. A search section 18 compares the search request with file information stored in the data management section 13 to select the file information conforming to the search request. A search result display section 19 arranges file information conforming to the search request on the basis of the obtained importance, and displays the file information as the search result for the user.

Before giving a description of a process of an entire search system, firstly, processes of the file operation monitor section 11, the reference relation creation section 12, and the importance calculation section 15, which are adapted to calculate the importance, will be described.

Figure 5:
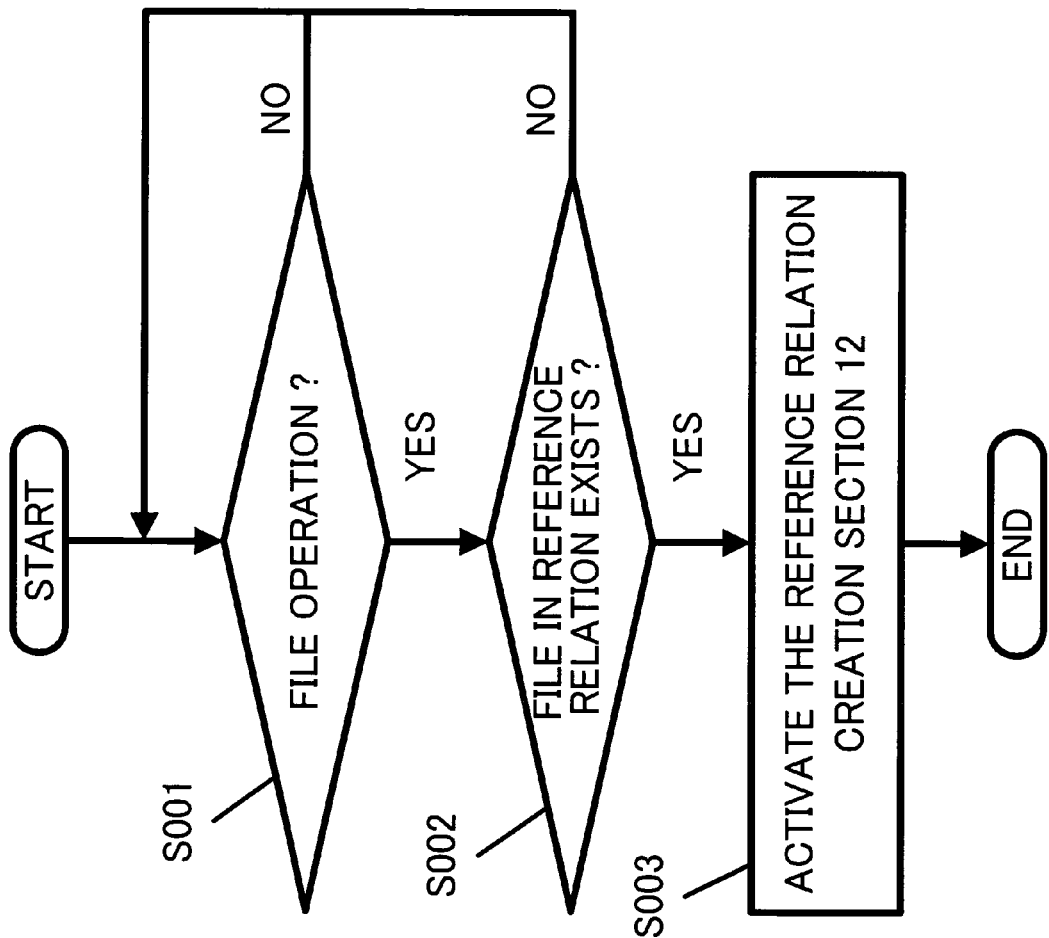
FIG. 5 is a flowchart showing a process of a file monitor operation section.

The process of the file operation monitor section 11 will be described with reference to FIG. 5.

In Step S001, the file operation monitor section 11 judges whether or not there is a file operation by a user. The file operation to be monitored includes all the operations such as open, close, read, write, and delete of the file, and copy and paste. However, it is also conceivable that a configuration may be employed where only a part of file operations are set to be monitored at the time of the system design. When the judgment is YES, the user has performed the file operation, and the process shifts to Step S002. On the other hand, when the judgment is NO, the process returns to Step S001.

Figure 4A:
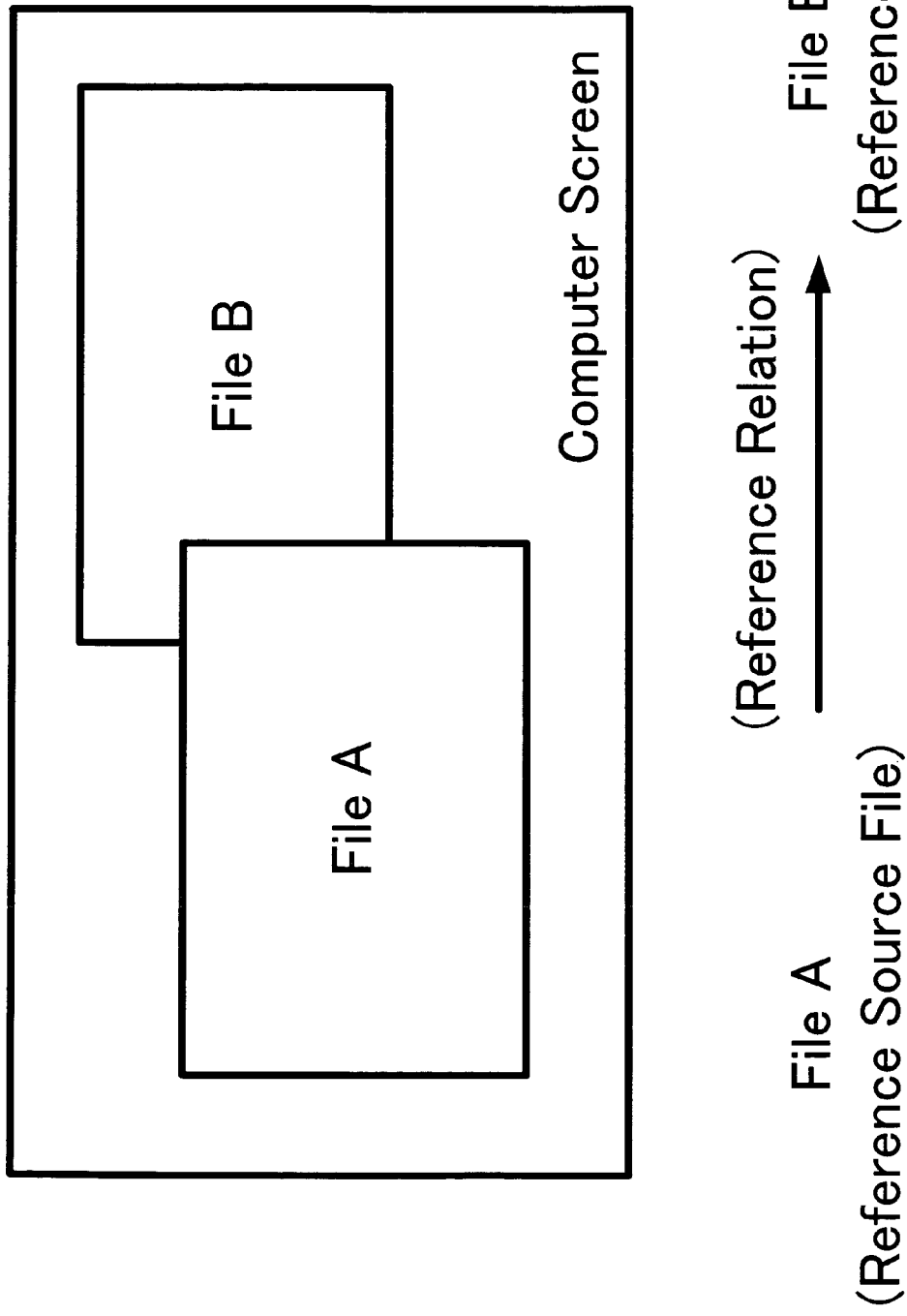
FIG. 4A shows an example of reference relation and FIG. 4B shows an example of a weight setting screen.

In Step S002, the file operation monitor section 11 judges whether or not a file in reference relation to the corresponding file exists. When the judgment is YES, the file in the reference relation exists, and the process shifts to Step S003. On the other hand, when the judgment is NO, the process returns to Step S001. Here, the reference relation will be described. For example, when a file A and a file B are opened and the content of the file B is introduced into the file A as shown in FIG. 4A, the reference relation refers to a relation between a the file A (reference source file) and the file B (reference file). File reference by the user includes introduction of the information of the reference file into the reference source file, storage with a new name given to the reference source file after the introduction of the information of the reference file into the reference source file, and the like. In view of the above, determination as to the reference source file and the reference file is conducted by monitoring the user operations including copy of which file and paste to which file. Therefore, the file which is active when the user performs the copy is set as the reference file and the file which is active when the user performs the paste is set as the reference source file.

In Step S003, the file operation monitor section 11 activates the reference relation creation section 12. Then, the process is finished.

Figure 6:
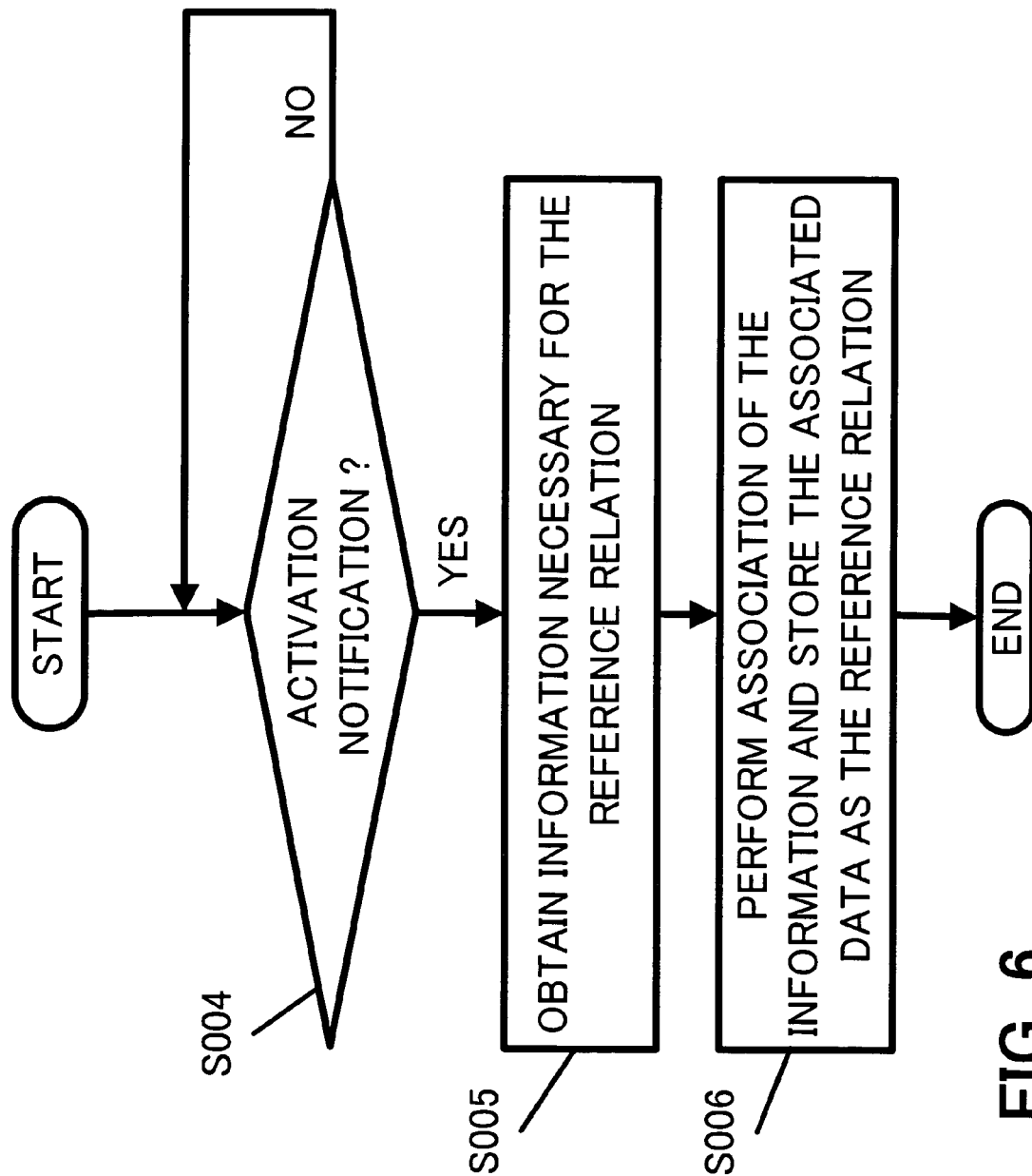
FIG. 6 is a flowchart showing a process of a reference relation creation section.

The process of the reference relation creation section 12 will be described with reference to FIG. 6.

In Step S004, the reference relation creation section 12 judges whether or not there is an activation notification from the file operation monitor section 11. When the judgment is YES, there is an activation notification, and the process shifts to Step S005. On the other hand, when the judgment is NO, the process returns to Step S004.

In Step S005, the reference relation creation section 12 obtains information necessary for the reference relation. The information necessary for the reference relation herein includes a reference source file, a reference file, a user who has performed the file operation, date and time when the file operation was performed, the number of times for performing copy from the reference file and paste to the reference source file, and the like. The process shifts to Step S006.

In Step S006, the reference relation creation section 12 performs association of the information obtained in Step S005 and stores the data in the data management section 13 as the reference relation. Then, the process is finished. FIG. 3A shows an example of the stored data being associated as the reference relation. For example, it is understood from a reference relation 1 that a user A set the file A as the reference source file and the file B as the reference file, performed copy and paste 6 times from the file B to the file A for the reference time of 6 minutes and 36 seconds, and closed the file that is the reference file at 13:10 on Jun. 10, 2005.

Figure 7:
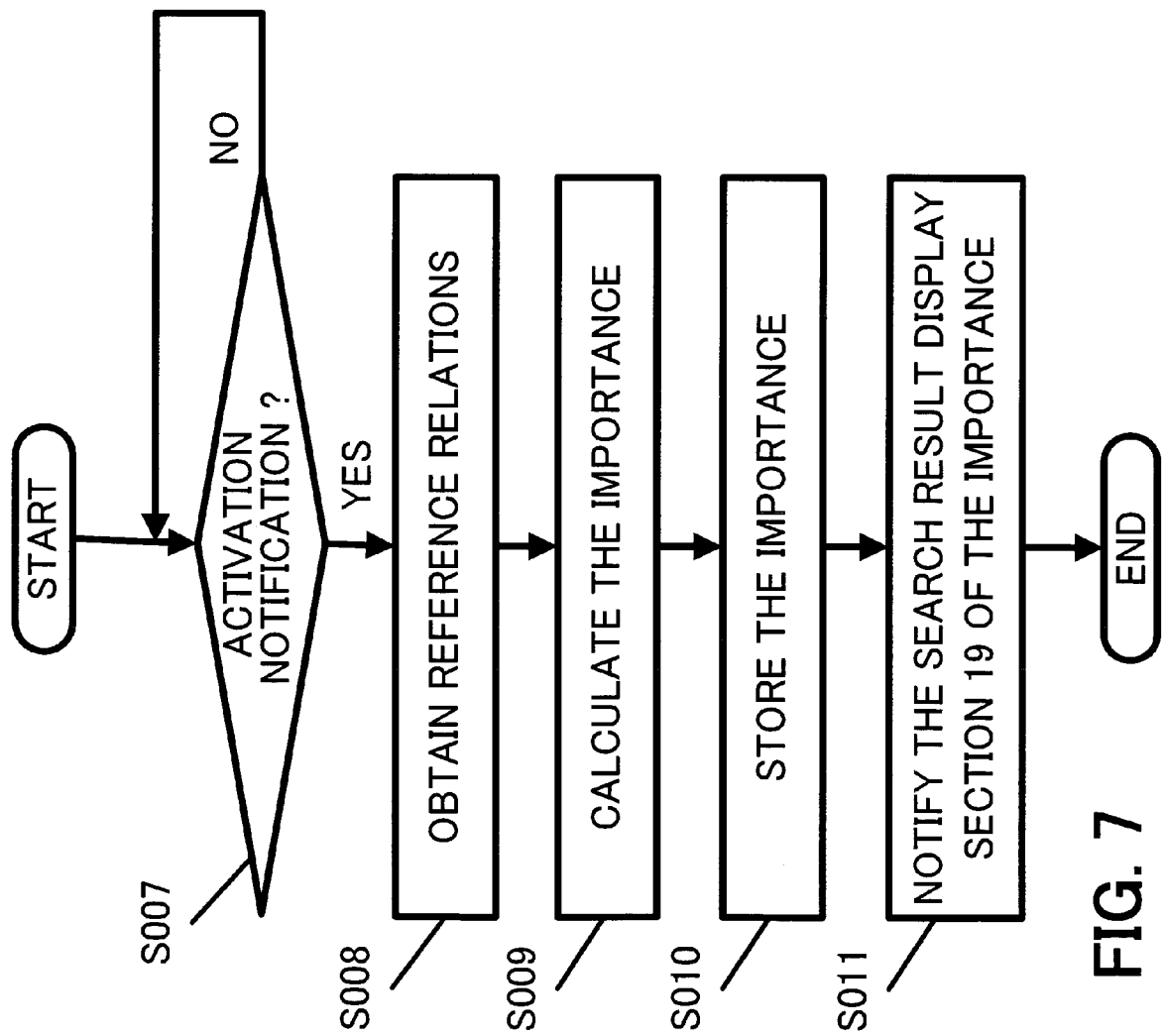
FIG. 7 is a flowchart showing a process of an importance calculation section.

The process of the importance calculation section 15 will be described with reference to FIG. 7.

In Step S007, the importance calculation section 15 judges whether or not there is a notification about a request of importance calculation by the user. When the judgment is YES, the notification about the request of importance calculation is made by the user, and the process shifts to Step S008. On the other hand, when the judgment is NO, the process returns to Step S007.

In Step S008, the importance calculation section 15 obtains reference relations from the data management section 13 and the process shifts to Step S009.

In Step S009, the importance calculation section 15 calculates the importance of the respective reference files from the respective reference relations obtained in Step S008 and the process shifts to Step S010.

Figure 25A:
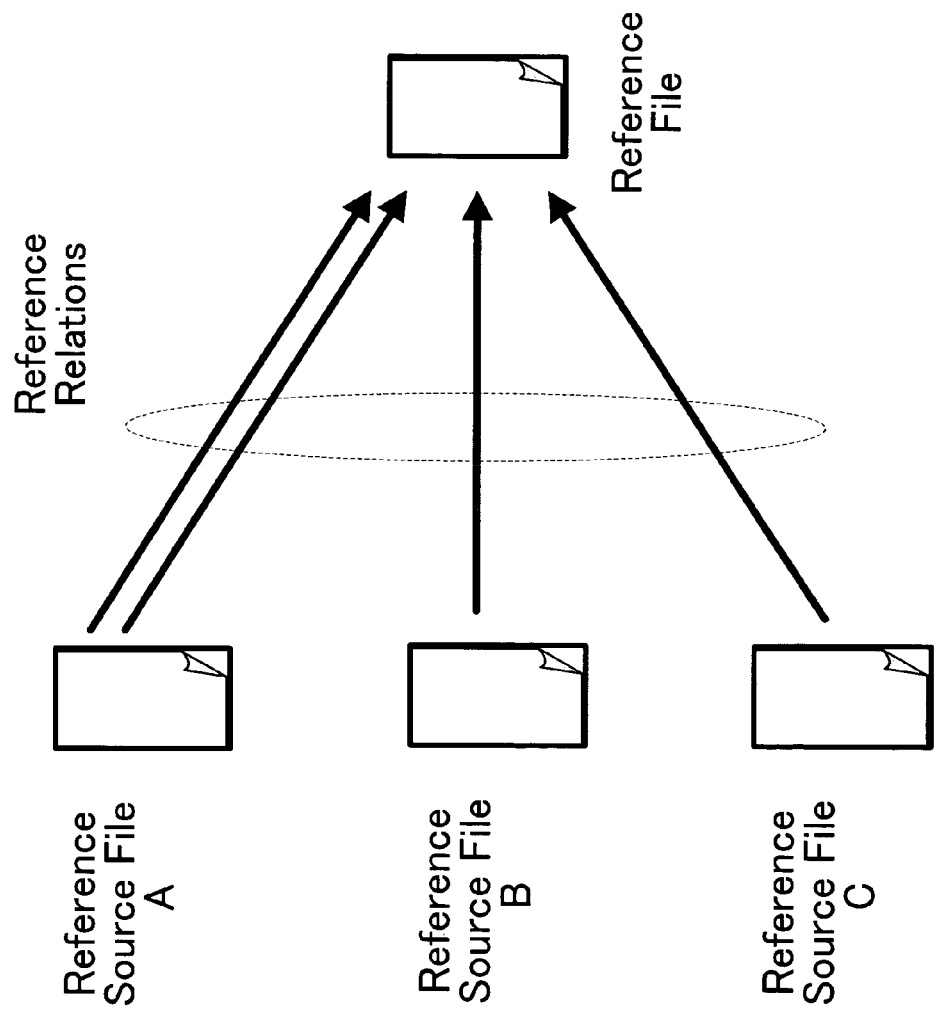
FIGS. 25A and 25B show examples of importance calculation.
Figure 25B:
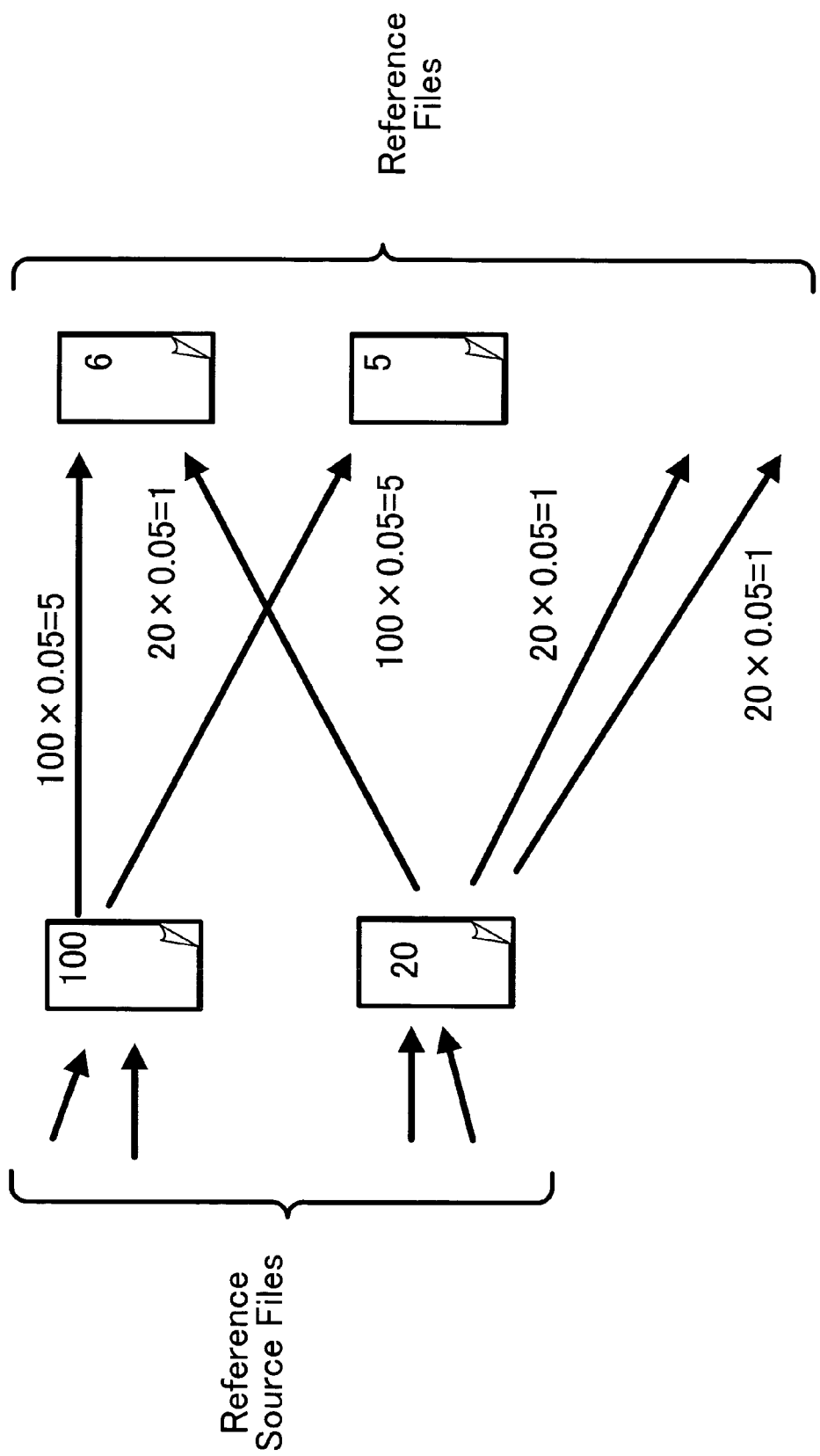

It is conceivable for example that a method of calculating the importance may include counting the number of times to be referenced (referenced count) or the number of the reference source files. FIG. 25A shows an example of a method of calculating the referenced count and the number of the reference source files. The reference file is referenced by 3 files of reference source files A, B, and C. In addition, the reference file is referenced by the reference source file A 2 times. In this case, the referenced count is 2+1+1=4 and the number of the reference source files is 1+1+1=3. The importance is 4 if the referenced count is used and 3 if the number of the reference source files is used.

Furthermore, it is also conceivable for example that the method of calculating the importance may include the following configuration. Each time a part of the reference file is copied and pasted to the reference source file, 10 points are added to the reference file. Also, when the reference time of the reference file is equal to longer than the predetermined value, 3 points are added to the reference file. As a result, it can be confirmed that a file with a short reference time and no copy operation involved is the file which was mistakenly opened by the user. For example, from the reference relation 1, copy and paste are performed from the file B to the file A 6 times, so 10×6=60 points are added to the file B. Furthermore, the reference time is 6 minutes and 36 second, which is longer than the predetermined value, so another 3 points are added to the file B. That is, with the operation by the user A, total 63 points are added to the file B. On the other hand, when copy and paste are not performed, this situation means that the user mistakenly opens the file or does not make a reference to the file. In this case, no reference relation is produced. Herein, in the case where a request of calculating the importance is made by the user when a reference relation 5 is produced, the importance of the reference file is calculated as follows. From a reference relation 2, 10×1+3=13 points are added to the file C. From a reference relation 3, 10×2+3=23 points are added to a file D. From a reference relation 4, 10×3+3=33 points are added to the file B. From a reference relation 5, 10×1+3=13 points are added to a file T. To elaborate, the file B is referenced by two files: the file A and the file C. Thus, total 63+33=96 points are added to the file B. Similarly, 13, 23, and 13 points are added to the files C, D, and T, respectively.

It is also conceivable that the method of calculating the importance may include introducing the reference file information into the reference source file, monitoring whether or not a new name is given to the reference source file for the data storage, and adding 30 points to the reference file when the new name is given to the reference source file for the data storage. If the new name is given to the reference source file for the data storage, the new file name is highly likely to have a meaning in the future operation. Therefore, the above-mentioned configuration is adopted to add points to the importance of the reference file when the new name is given to the reference source file for the data storage.

It is also conceivable that the method of calculating the importance may include monitoring the number of parts in the reference source file into which the reference file information is introduced. For example, in the case where reference file is a file for storing experiment data, it is conceivable that the user may copy data that is necessary for the user from the reference file and paste the same data at a plurality of parts in the reference source file. In this case however, the information amount is not large. Thus, such a configuration is adopted to add 10 points for the first copy and paste and add 5 points for the second and subsequent copy and paste, for example.

It is also conceivable that the method of calculating the importance may include monitoring the size of a text or the like introduced from the reference file into the reference source file and adding points proportional to the introduced text size to the reference file. This is because when the size amount of the introduced text or the like is large, the information of the reference file is accordingly referenced so much.

In Step S010, the importance calculation section 15 stores the importance of the respective reference files calculated in Step S009 in the data management section 13. Then, the stored importance can be obtained by the importance obtaining section 16. It should be noted that a process of the importance obtaining section 16 will be described later. Then, the process shifts to Step S011.

In Step S011, the importance calculation section 15 notifies the search result display section 19 of the importance of the respective reference files calculated in Step S009. It should be noted that a process of the search result display section 19 will be described later.

Subsequently, the process of the entire search system will be described.

Figure 8:
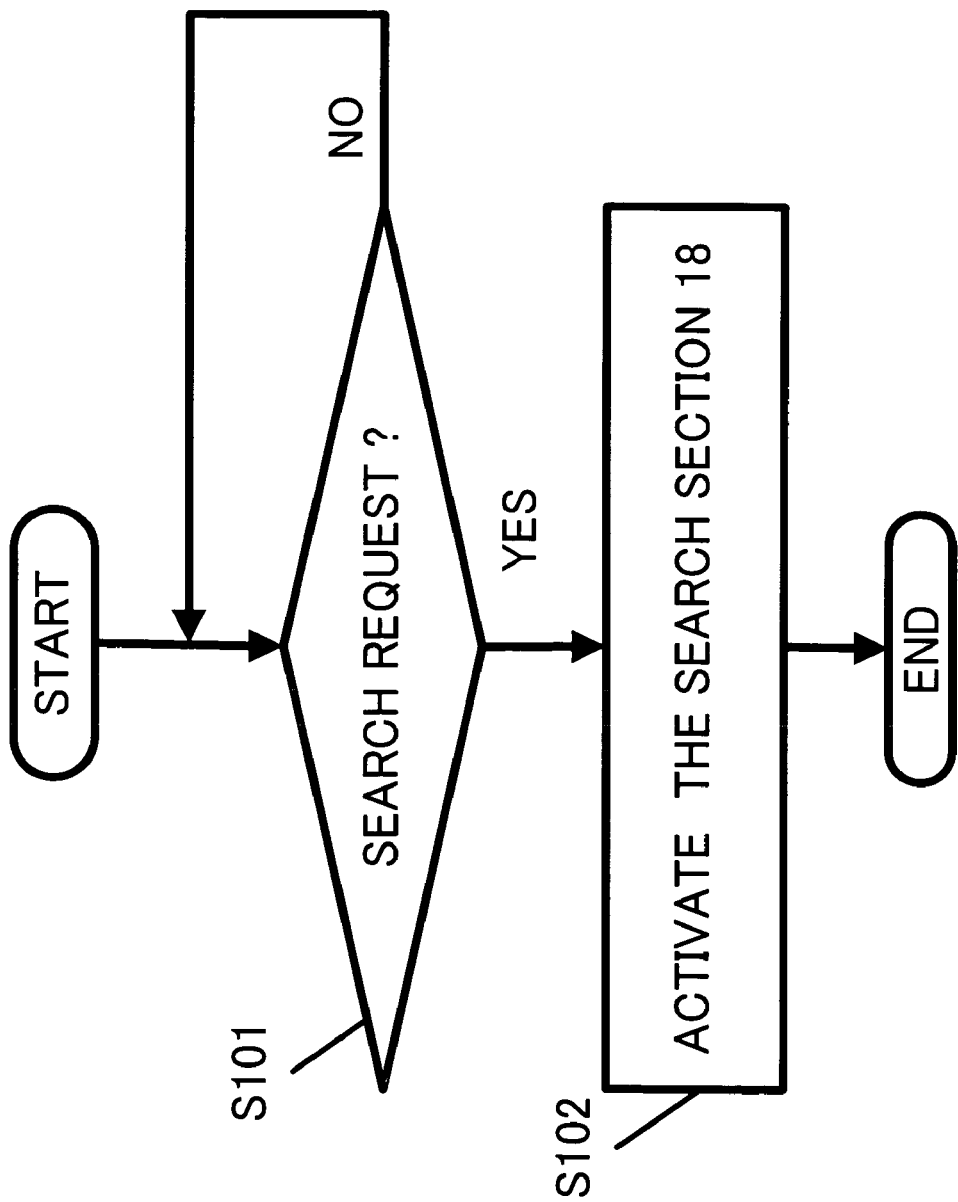
FIG. 8 is a flowchart showing a process of a request section.

A process of the request section 17 will be described with reference to FIG. 8.

In Step S101, the request section 17 judges whether or not there is a search request from the user. When the judgment is YES, there is a search request, and the process shifts to Step S102. On the other hand, when the judgment is NO, the process returns to Step S101. Here, a description will be given of the search request by the user. The search request means that the user inputs a file name of the desired file and a keyword included in the file from the input section 3 to perform the search.

In Step S102, the request section 17 activates the search section 18. Then, the process is finished.

Figure 9:
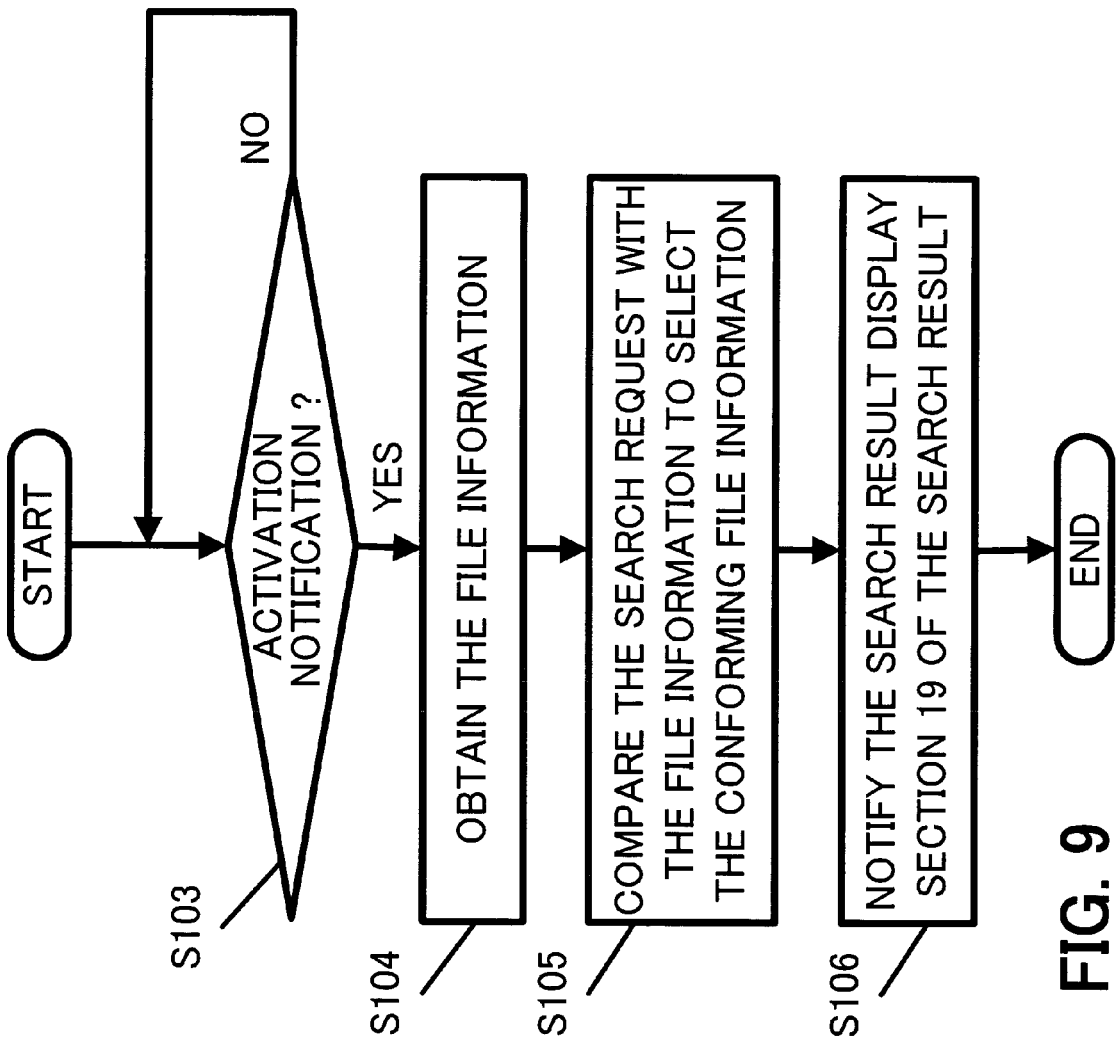
FIG. 9 is a flowchart showing a process of a search section.

A process of the search section 18 will be described with reference to FIG. 9.

The search section 18 performs the search process through a search method such as Boolean search or a vector space model. It should be noted that the present invention can be utilized irrespective of the search method.

In Step S103, the search section 18 judges whether or not there is an activation request from the request section 17. When the judgment is YES, there is an activation request, and the process shifts to Step S104. On the other hand, when the judgment is NO, the process returns to Step S103.

In Step S104, the search section 18 obtains the file information from the data management section 13. The file information includes a name of the search target file, an index created from the file, other attribute information of the file. Then, the process shifts to Step S105.

In Step S105, the search section 18 compares the search request and the file information with each other to select the conforming file. Then, the process shifts to Step S106.

In Step S106, the search section 18 notifies the search result display section 19 of the search result. Then, the process is finished.

Figure 10:
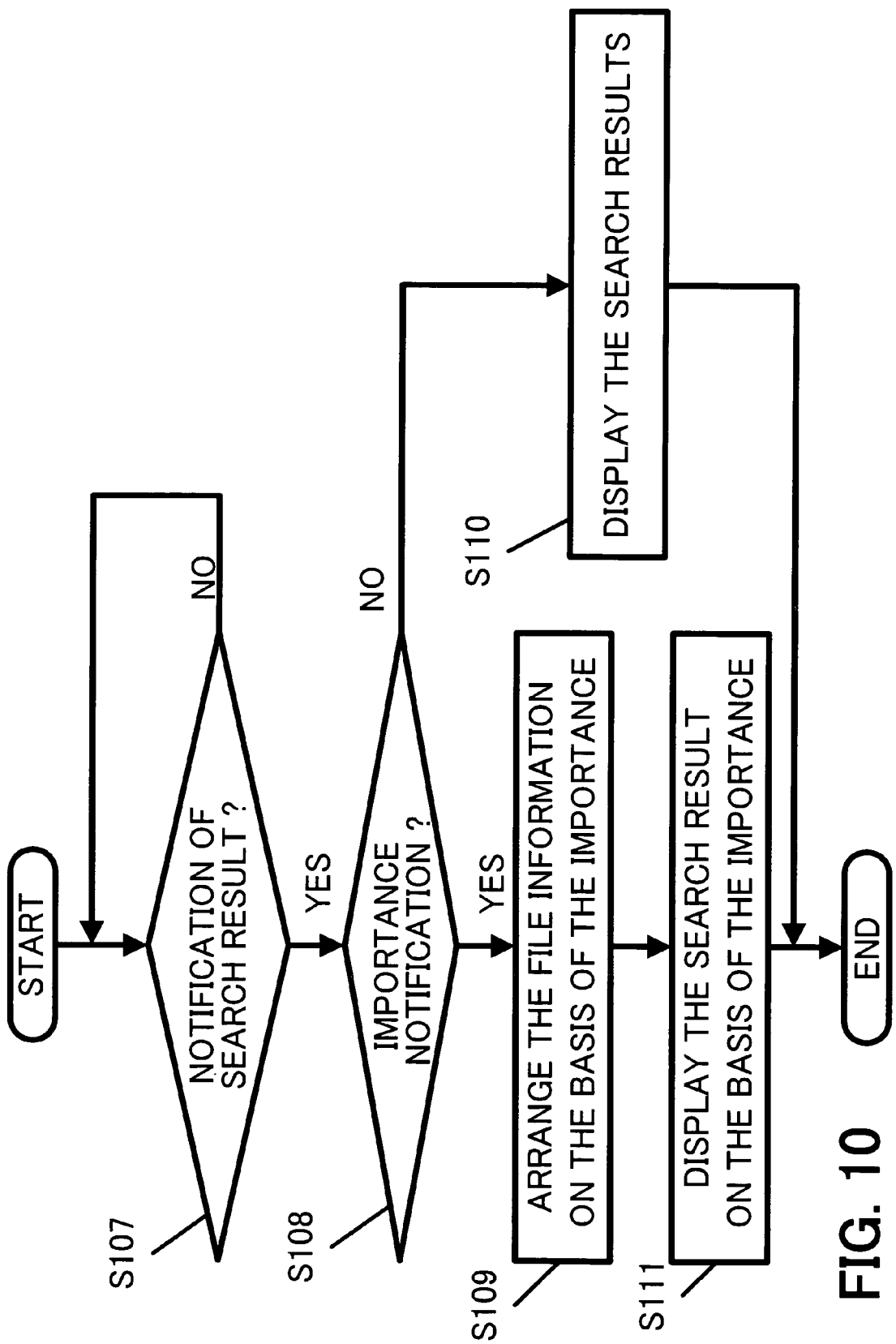
FIG. 10 is a flowchart showing a process of a search result display section.

A process of the search result display section 19 will be described with reference to FIG. 10.

In Step S107, the search result display section 19 judges whether or not there is a search result notification from the search section 18. When the judgment is YES, there is a search result notification, and the process shifts to Step S108. On the other hand, when the judgment is NO, the process returns to Step S007.

In Step S108, the search result display section 19 judges whether or not there is a notification of the importance from the importance calculation section 15 or the importance obtaining section 16. When the judgment is YES, there is a notification of the importance, and the process shifts to Step S109. On the other hand, when the judgment is NO, the process shifts to Step S110. It should be noted that a process of the importance notification will be described later.

In Step S110, the search result display section 19 displays the search results on the display section 2. Then, the process is finished.

In Step S109, the search result display section 19 arranges the file information of the search results on the basis of the importance. Then, the process shifts to Step S111.

Figure 31A:
FIG. 31A shows an example in which search results are arranged on the basis of the importance and FIG. 31B shows an example in which the importance and updated date and time are switched and selected.

In Step S111, the search result display section 19 displays the search results arranged on the basis of the importance. Then, the process is finished. FIG. 31A shows the search results before the arrangement based on the importance and after the arrangement based on the importance. By arranging the search results so that a file with higher importance is displayed in the upper section, the user understands that the file displayed in the upper section is a file being referenced.

Subsequently, the importance notification in Step S108 of FIG. 10 will be described with reference to the drawing. According to the first embodiment, it is possible for the user to select whether or not the importance is reflected on the search results when the user requests the search. When the user desires that the importance is reflected on the search results, the user can notify the weight setting section 14 and the importance obtaining section 16 of that effect from the request section 17. Then, the search result display section 19 is notified of the importance from the importance calculation section 15 and the importance obtaining section 16.

Figure 11:
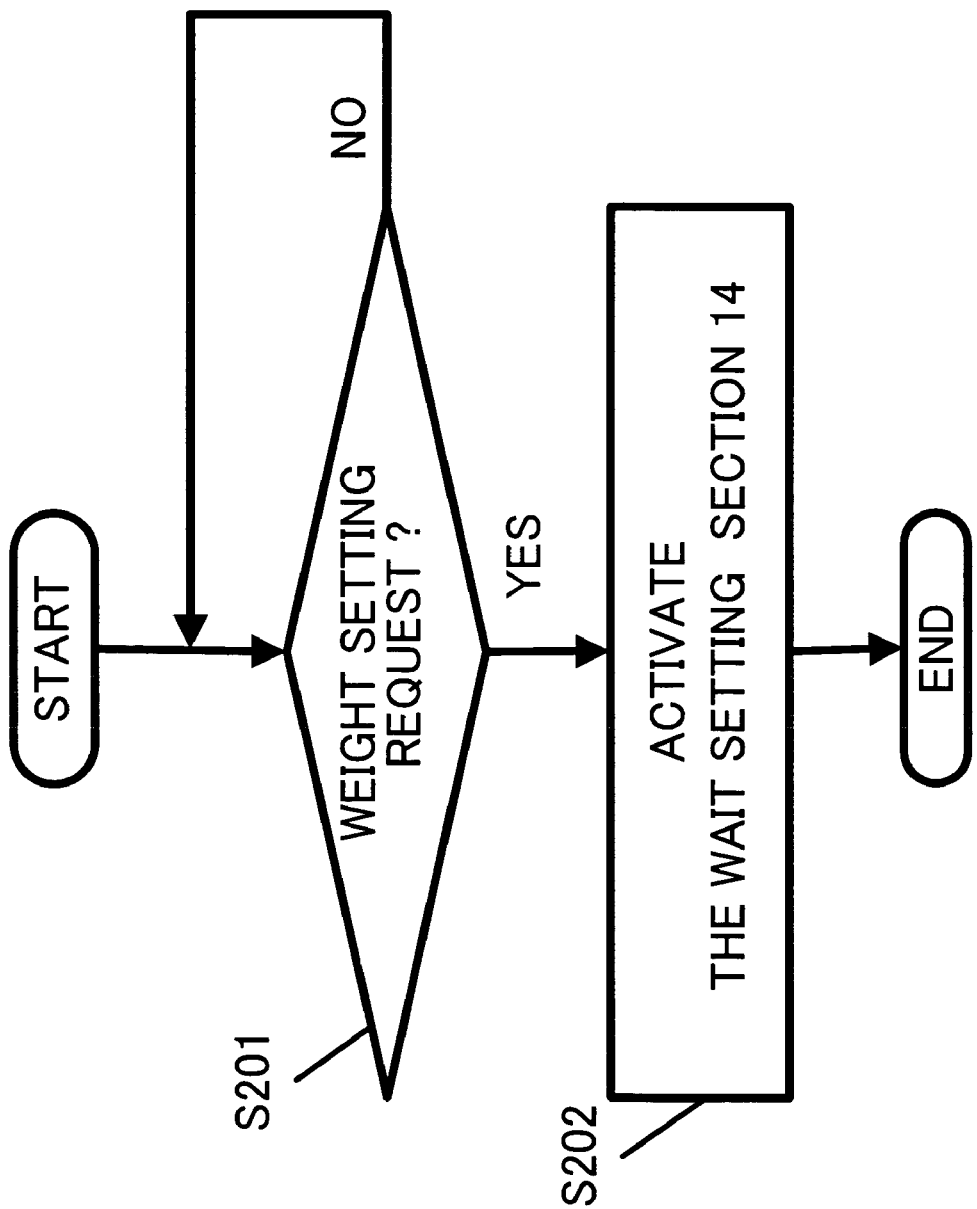
FIG. 11 is a flowchart showing a process of the request section.

A process of the request section 17 will be described with reference to FIG. 11.

In step S201, the request section 17 judges whether or not there is a weight setting request by the user. When the judgment is YES, there is a weight setting request, and the process shifts to Step S202. On the other hand, when the judgment is NO, the process returns to Step S201.

Figure 3C:
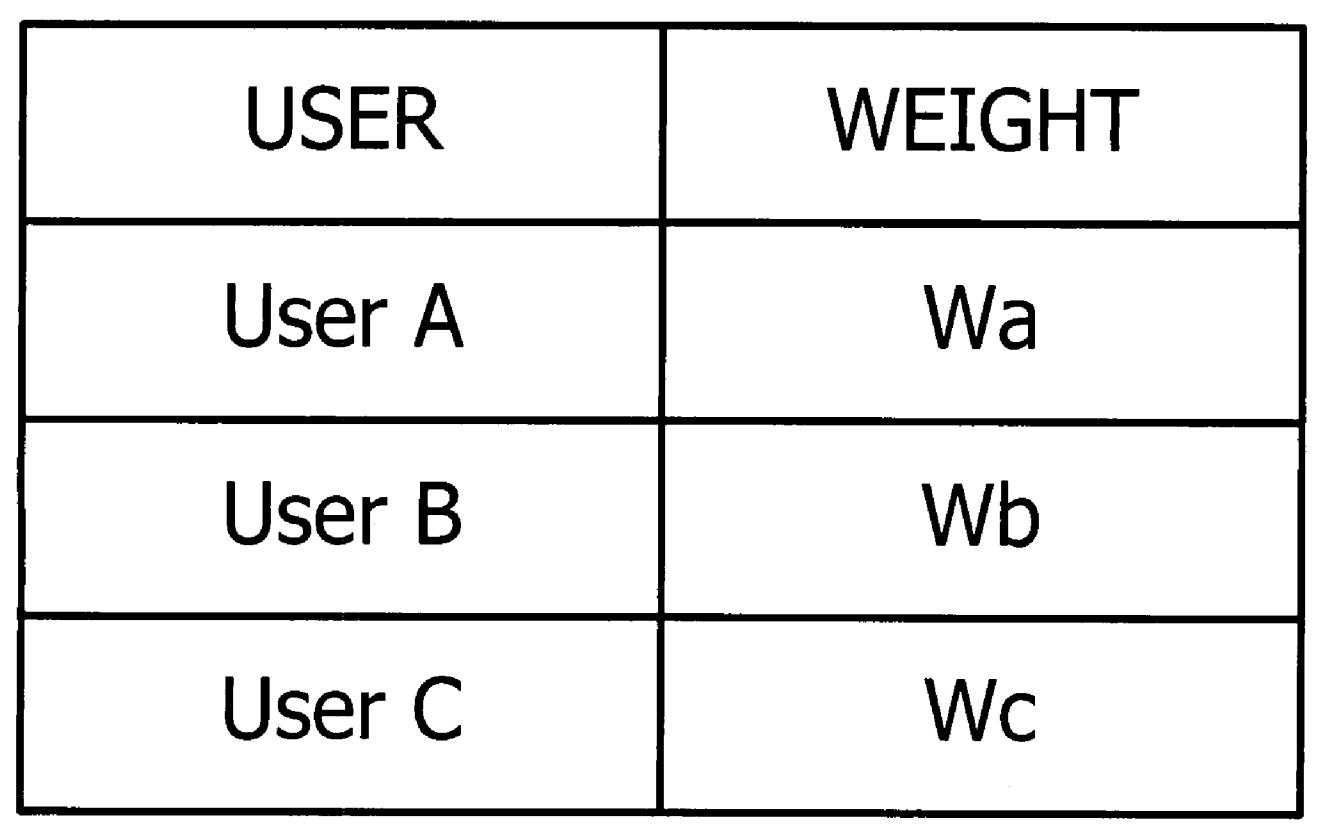

In step S202, the request section 17 activates the weight setting section 14, and then, the process is finished. Here the weight setting section 14 will be described. In the process of the importance calculation section 15 described with reference to FIG. 7, for the importance calculation, the respective items of the reference relation (the number of execution of copy and paste, the reference time, and the like) are equally treated but it is also conceivable that the configuration may include calculating the importance by putting a weight on the respective items by the weight setting section 14. FIG. 3C shows an example of weight setting conducted by the user. After the weighting is performed as shown in FIG. 3C, when the importance is calculated through the importance calculation method described with reference to FIG. 25A, each importance thus calculated is as follows. The importance calculated by using the referenced count is $2 \times Wa + 1 \times Wb + 1 \times Wc = 2Wa + Wb + Wc$. The importance calculated by using the number of the reference source file is $Wa + Wb + Wc$. In particular, in the case of $(Wa, Wb, Wc) = (1, 0, 0)$, this case is equivalent to the calculation of the importance of the file on which only the user A performs the file operation.

It is also conceivable that the configuration may include preparing a dedicated screen for the weight setting and operating a graphical user interface (GUI) operation by the user to set the weight.

Figure 4B:
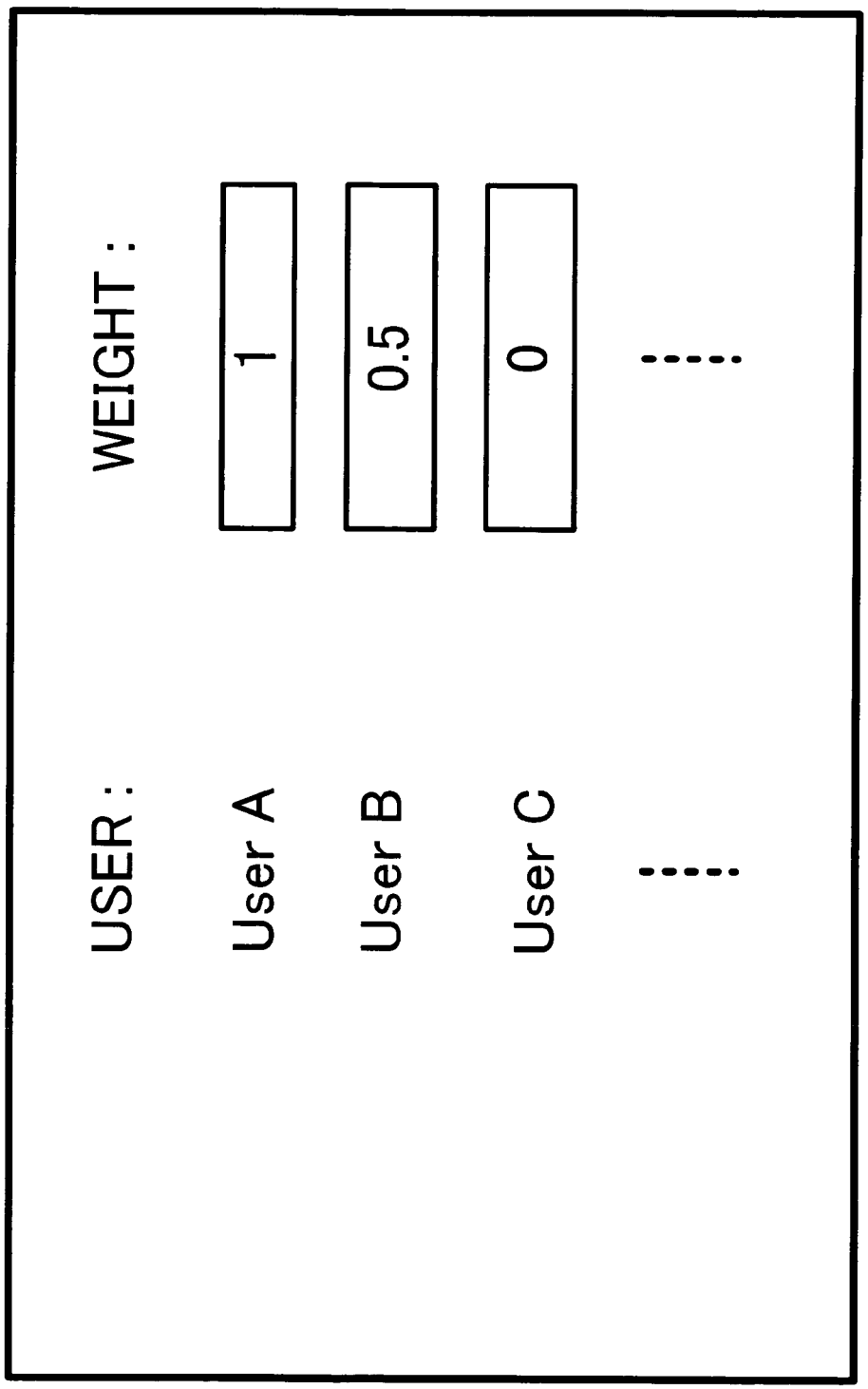

FIG. 4B shows a weight setting screen for setting weight of users. Users managed by the data management section are displayed on the screen, indicating that the weight of the user A is 1, the weight of the user B is 0.5 there is a weight setting request, and the weight of the user C is 0. It should be noted that the weight setting can be performed on the reference source files, the referenced date and time, and the like, similarly to the weight setting on the users. For example, when the weight setting is performed on the referenced date and time, a weight is put on a file with the most recent referenced date and time, whereby it is possible to increase the importance of the files with relatively new referenced date and time.

Figure 26A:
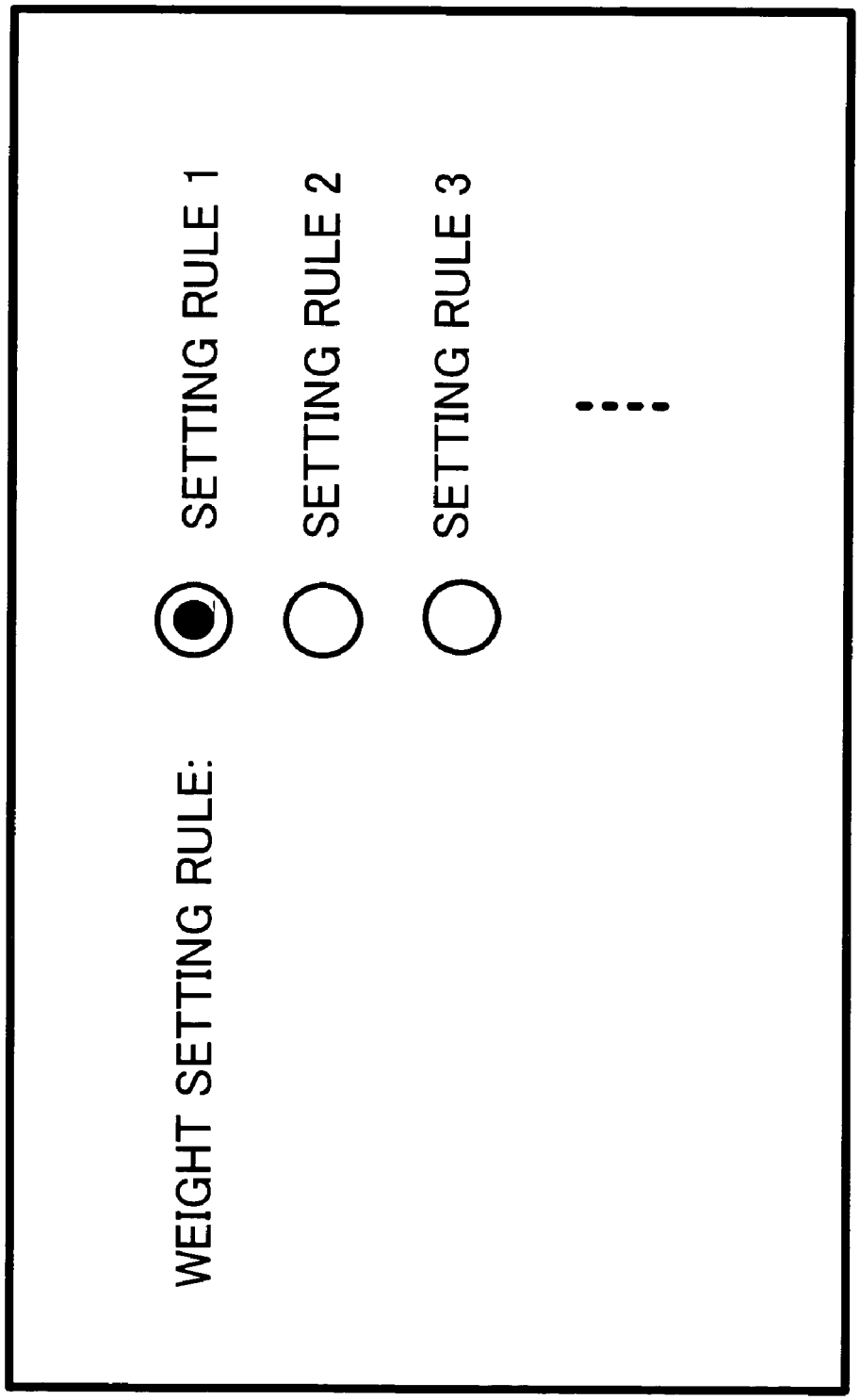
FIG. 26A shows an example of a weight setting rule selection screen and FIG. 26B shows an example of importance selection screen.

Moreover, it is also conceivable that the configuration may include preparing weight setting rules of the reference relation in advance, storing the weight setting rules in the data management section 13, and obtaining the weight setting rule to be used by the weight setting section 14 use in response to a request by the user. The weight setting rule defines which weight should be put on which item among the items of the reference relation. The weight setting rule is selected by performing the GUI operation on the prepared dedicated screen by the user. FIG. 26A shows a selection screen of the weight setting rule. The setting rules stored in the data management section 13 are displayed on the screen. A rule which the user desires to use is selected among the displayed setting rules by the user.

Figure 12:
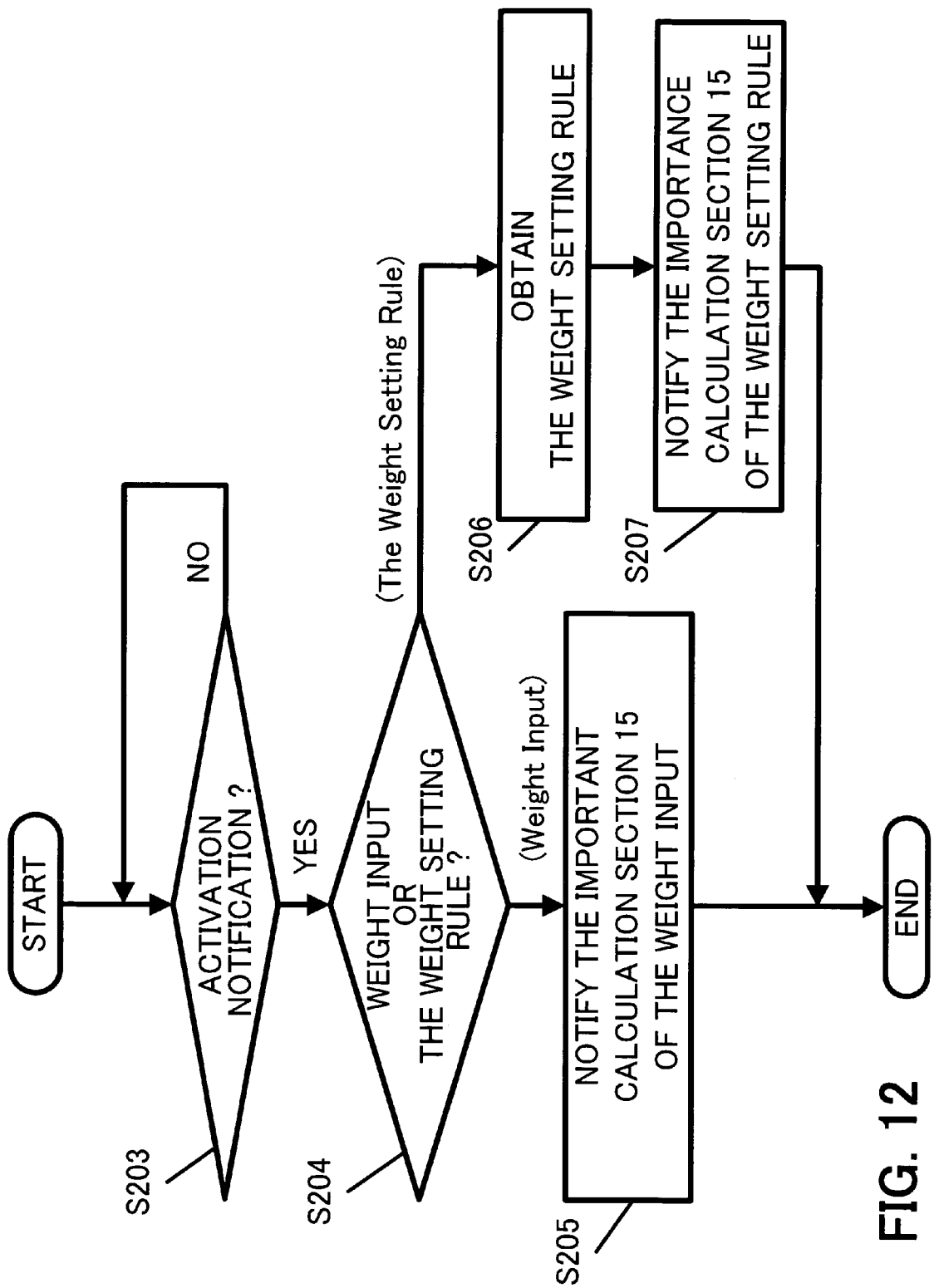
FIG. 12 is a flowchart showing a process of a weight setting section.

A process of the weight setting section 14 will be described with reference to FIG. 12.

In step S203, the weight setting section 14 judges whether or not there is an activation notification from the request section 17. When the judgment is YES, there is an activation notification, and the process shifts to Step S204. On the other hand, when the judgment is NO, the process returns to Step S203.

In step S204, the weight setting section 14 judges whether the notification from the request section 17 is for requesting the weight input or for requesting the use of the weight setting rule by the user. When the notification is for requesting the weight input by the user, the process shifts to Step S205. On the other hand, when the notification is for requesting the use of the weight setting rule by the user, the process shifts to Step S206.

In step S205, the weight setting section 14 notifies the importance calculation section 15 of the weight input by the user. Then, the process is finished.

In step S206, the weight setting section 14 obtains the weight setting rule selected by the user from the data management section 13, and the process shifts to Step S207.

In step S207, the weight setting section 14 notifies the importance calculation section 15 of the selected weight setting rule obtained in Step S206 from the data management section 13. Then, the process is finished.

Here, a process of the importance calculation section 15 will be described with reference to FIGS. 13 and 14.

Figure 13:
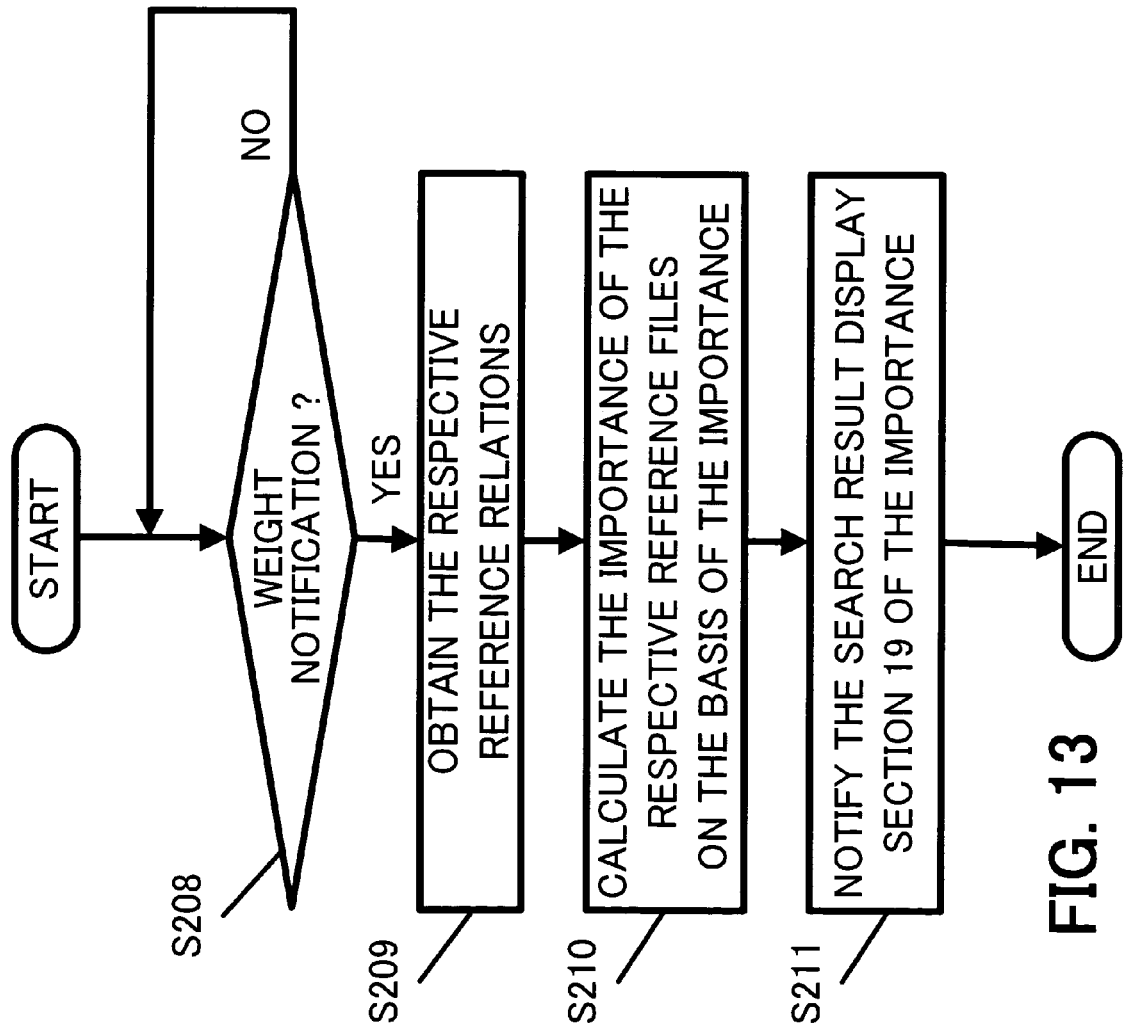
FIG. 13 is a flowchart showing a process of the importance calculation section.
Figure 14:
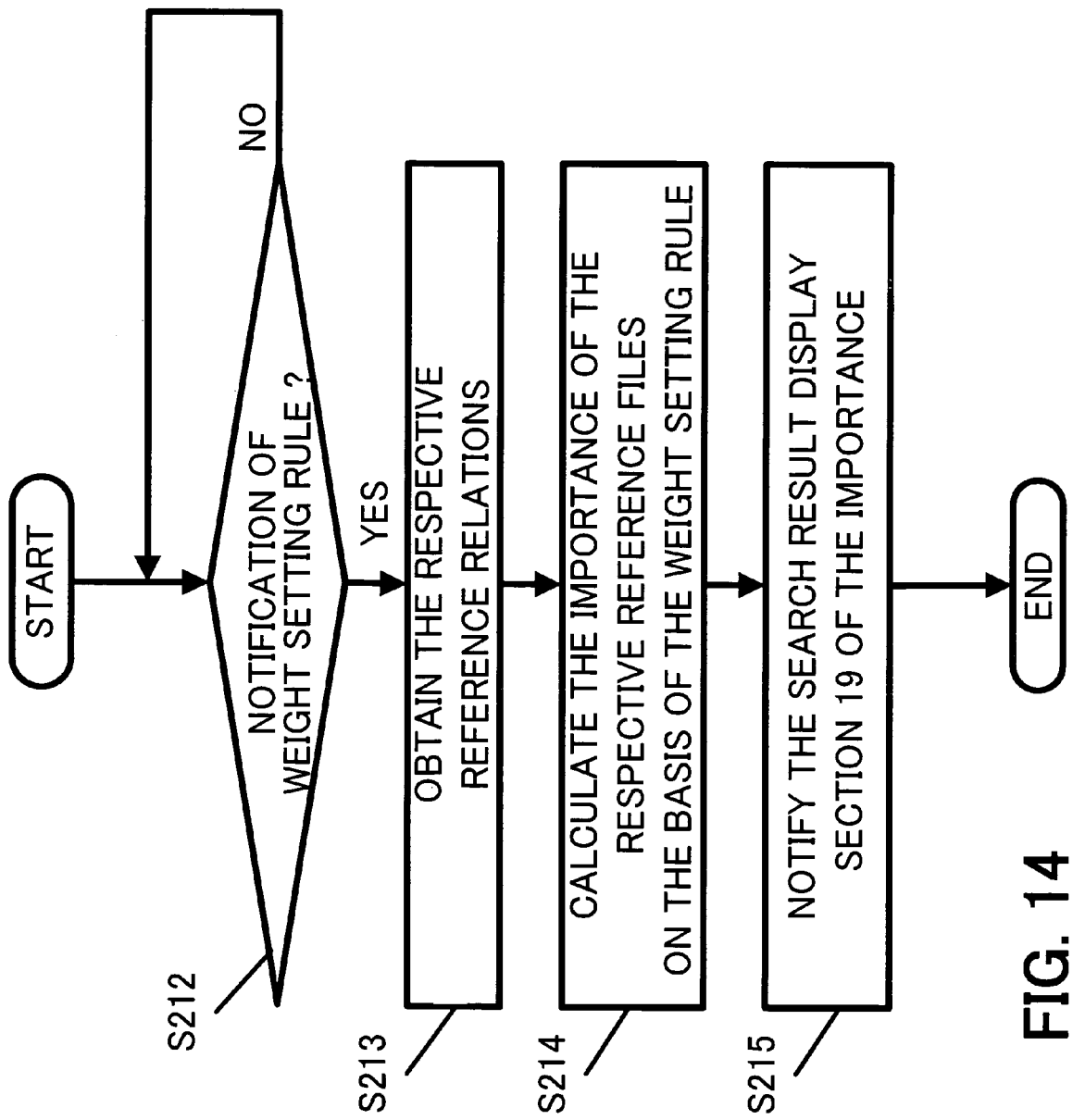
FIG. 14 is a flowchart showing a process of the importance calculation section.

FIG. 13 shows the process of the importance calculation section 15 in the case of detecting weight notification from the weight setting section 14, while FIG. 14 shows the process of the importance calculation section 15 in the case of detecting notification of weight setting rule from the weight setting section 14.

In step S208, the importance calculation section 15 judges whether or not there is a notification of the weight input by the user from the weight setting section 14. When the judgment is YES, there is a notification of the weight input by the user, and the process shifts to Step S209. On the other hand, when the judgment is NO, the process returns to Step S208.

In step S209, the importance calculation section 15 obtains the respective reference relations from the data management section 13. The process shifts to Step S210.

In step S210, the importance calculation section 15 calculates the importance of the respective reference files on the basis of the importance notified in Step S208. Then, the process shifts to Step S211.

In step S211, the importance calculation section 15 notifies the search result display section 19 of the importance of the respective reference files calculated in Step S210. Then, the process is finished.

In step S212, the importance calculation section 15 judges whether or not there is a notification of the weight setting rule selected by the user from the weight setting section 14. When the judgment is YES, there is a notification of the weight setting rule selected by the user, and the process shifts to Step S213. On the other hand, when the judgment is NO, the process returns to Step S212.

In step S213, the importance calculation section 15 obtains the respective reference relations from the data management section 13, and the process shifts to Step S214.

In step S214, the importance calculation section 15 calculates the importance of the respective reference files on the basis of the weight setting rule notified in Step S212, and the process shifts to Step S214.

In step S215, the importance calculation section 15 notifies the search result display section 19 of the importance of the respective reference files calculated in Step S214. Then, the process is finished.

Figure 26B:
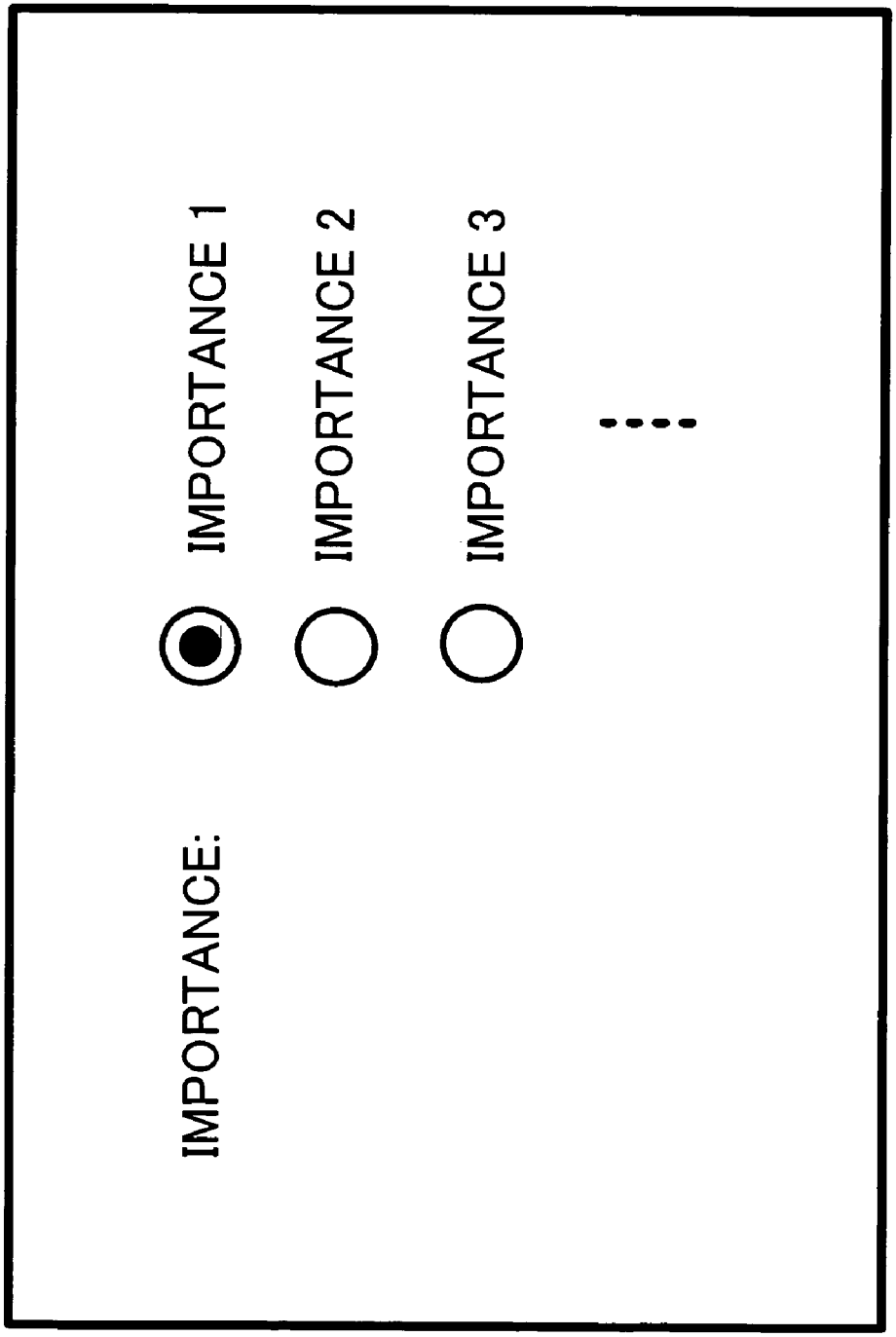

In the process of the importance calculation section 15 described with reference to FIG. 8, the importance is calculated each time the importance calculation request is made by the user. However, when the importance is used, such a configuration is also conceivable that the importance obtaining section 16 obtains the importance previously stored in the data management section 13 and notifies the search result display section 19 of the thus obtained importance. By using the stored importance, it is possible to omit the process for calculating the importance. The importance can be selected by performing the GUI operation on the prepared dedicated screen by the user. FIG. 26B shows a selection screen of the importance. Each importance stored in the data management section 13 is displayed on the screen.

Figure 15:
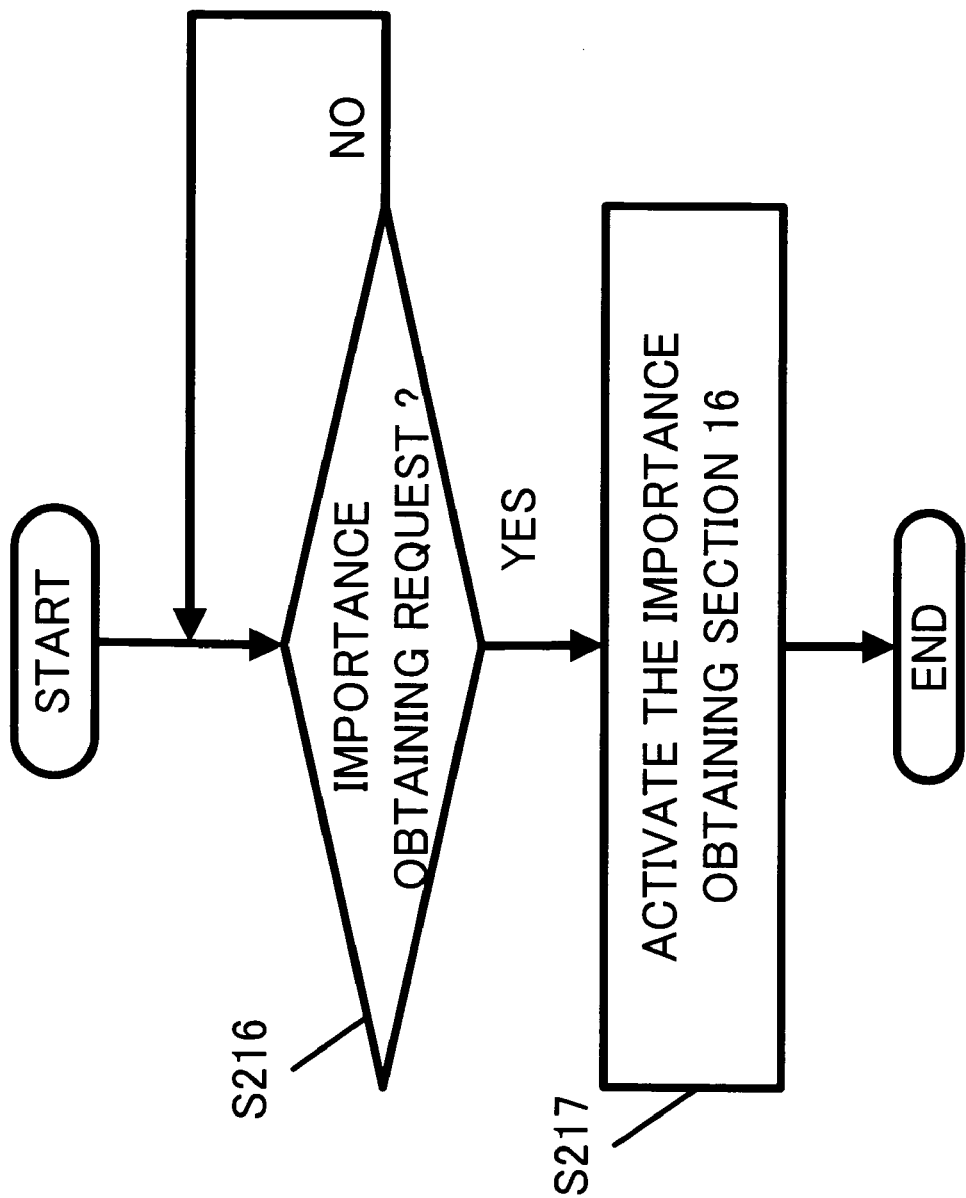
FIG. 15 is a flowchart showing a process of the request section.

A process of the request section 17 will be described with reference to FIG. 15.

In step S216, the request section 17 judges whether or not there is an importance obtaining request by the user. When the judgment is YES, there is an importance obtaining request, and the process shifts to Step S217. On the other hand, when the judgment is NO, the process returns to Step S216.

In step S217, the request section 17 activates the importance obtaining section 16. Then, the process is finished.

Figure 16:
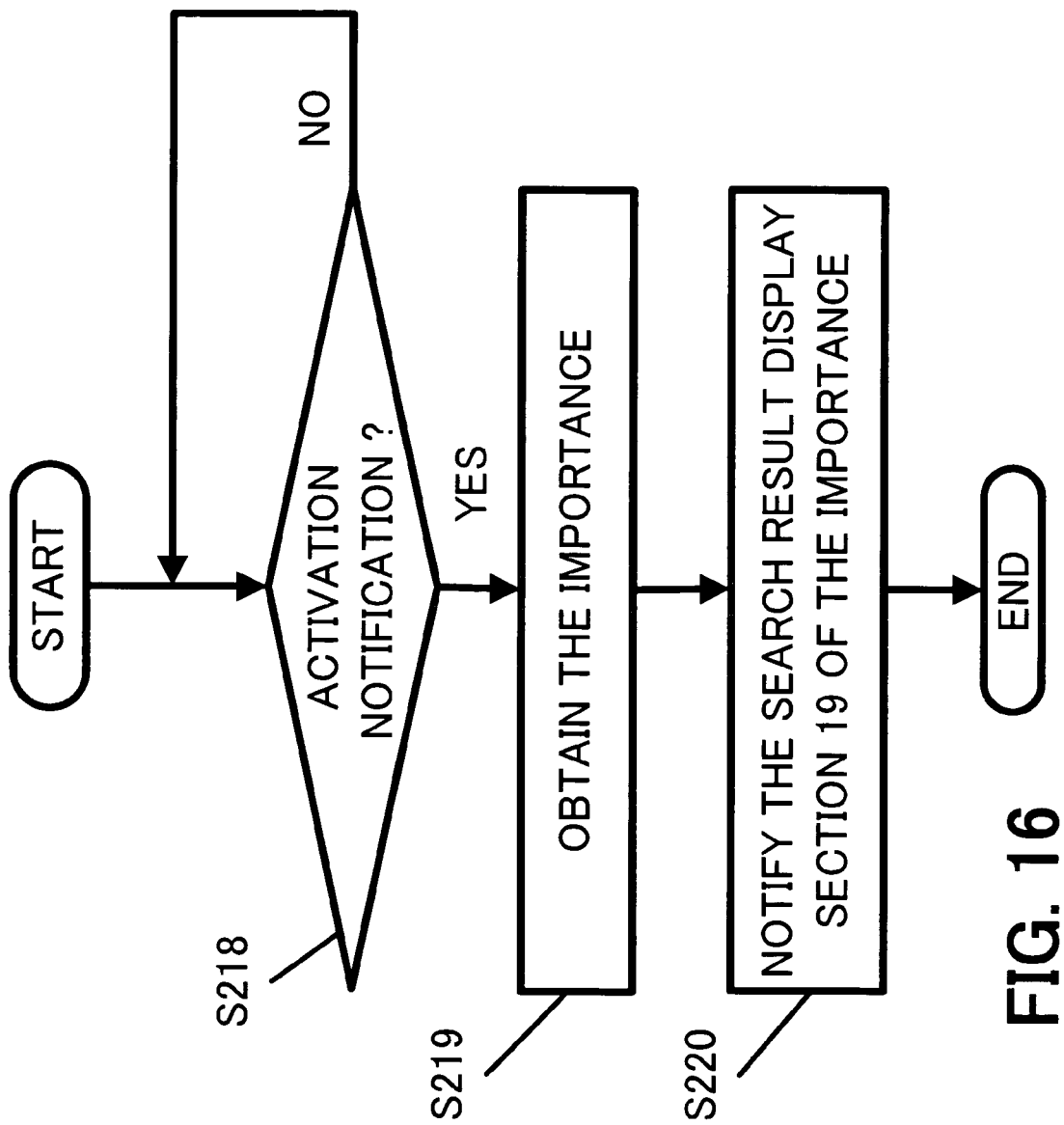
FIG. 16 is a flowchart showing a process of an importance obtaining section.

A process of the importance obtaining section 16 will be described with reference to FIG. 16.

In step S218, the importance obtaining section 16 judges whether or not there is an activation notification from the request section 17. When the judgment is YES, there is an activation notification, and the process shifts to Step S219. On the other hand, when the judgment is NO, the process returns to Step S218.

In step S219, the importance obtaining section 16 obtains the importance from the data management section 13. Then, the process shifts to Step S220.

In step S220, the importance obtaining section 16 notifies the search result display section 19 of the importance obtained in Step S219. Then, the process is finished.

Second Embodiment

According to the first embodiment, setting of the importance or the weight setting rule is performed each time the user makes the search request, but such a configuration is also conceivable that association of the importance or the like is performed for each user who has made the search request. With the configuration, it is unnecessary to set the importance or the like each time the user makes the search request.

According to a second embodiment, in the process of the importance calculation section 15 described with reference to FIG. 7, Step S010 is configured to perform association between the user information and the importance and store the user information and the importance in the data management section 13. Furthermore, in the process of the weight setting section 14 described with reference to FIG. 12, a configuration of adding a step of performing association between the user information and the weight setting rule and storing the user information and the weight setting rule in the data management section 13 after Step S206. Herein, the user information is information with which the user can be identified, such as a login name. With the configuration, the weight setting section 14 and the importance obtaining section 16 can obtain the importance and the weight setting rule which are associated with the user information.

Figure 17:
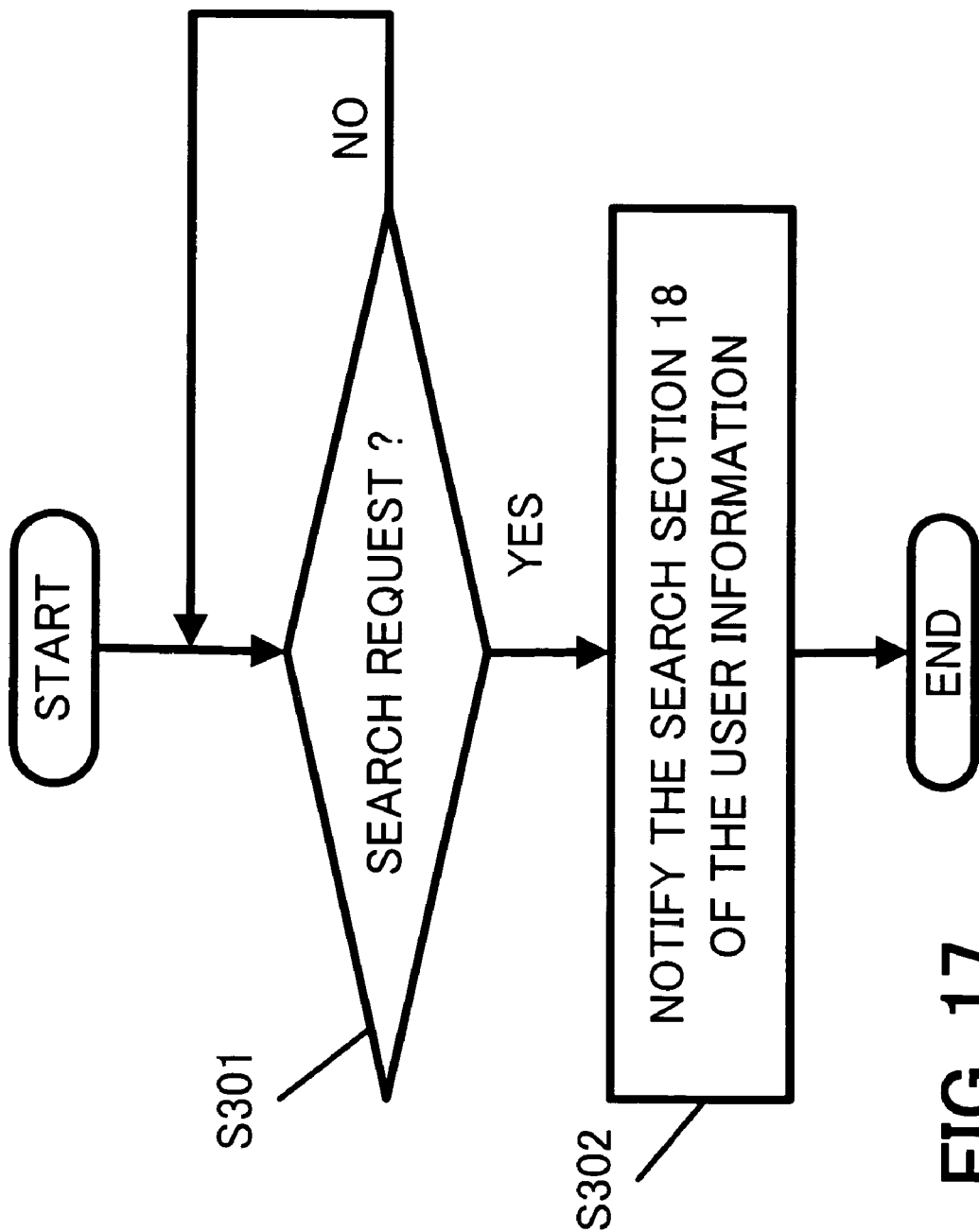
FIG. 17 is a flowchart showing a process of the request section.

A process of the request section 17 will be described with reference to FIG. 17.

In Step S301, the request section 17 judges whether or not there is a search request by the user. When the judgment is YES, there is a search request, and the process shifts to Step S302. On the other hand, when the judgment is NO, the process returns to Step S301.

In Step S302, the request section 17 notifies the search section 18 of the user information. Then, the process is finished.

Here, a description will be given of the search request by the user. FIG. 30 shows a search condition setting screen according to this embodiment. As shown in FIG. 30, the search request means that the user inputs a name of a desired file, a keyword included in the file, and a login name from the input section 3, and furthermore in order to use the importance or the like associated with each user, turns on a corresponding check box.

Figure 18:
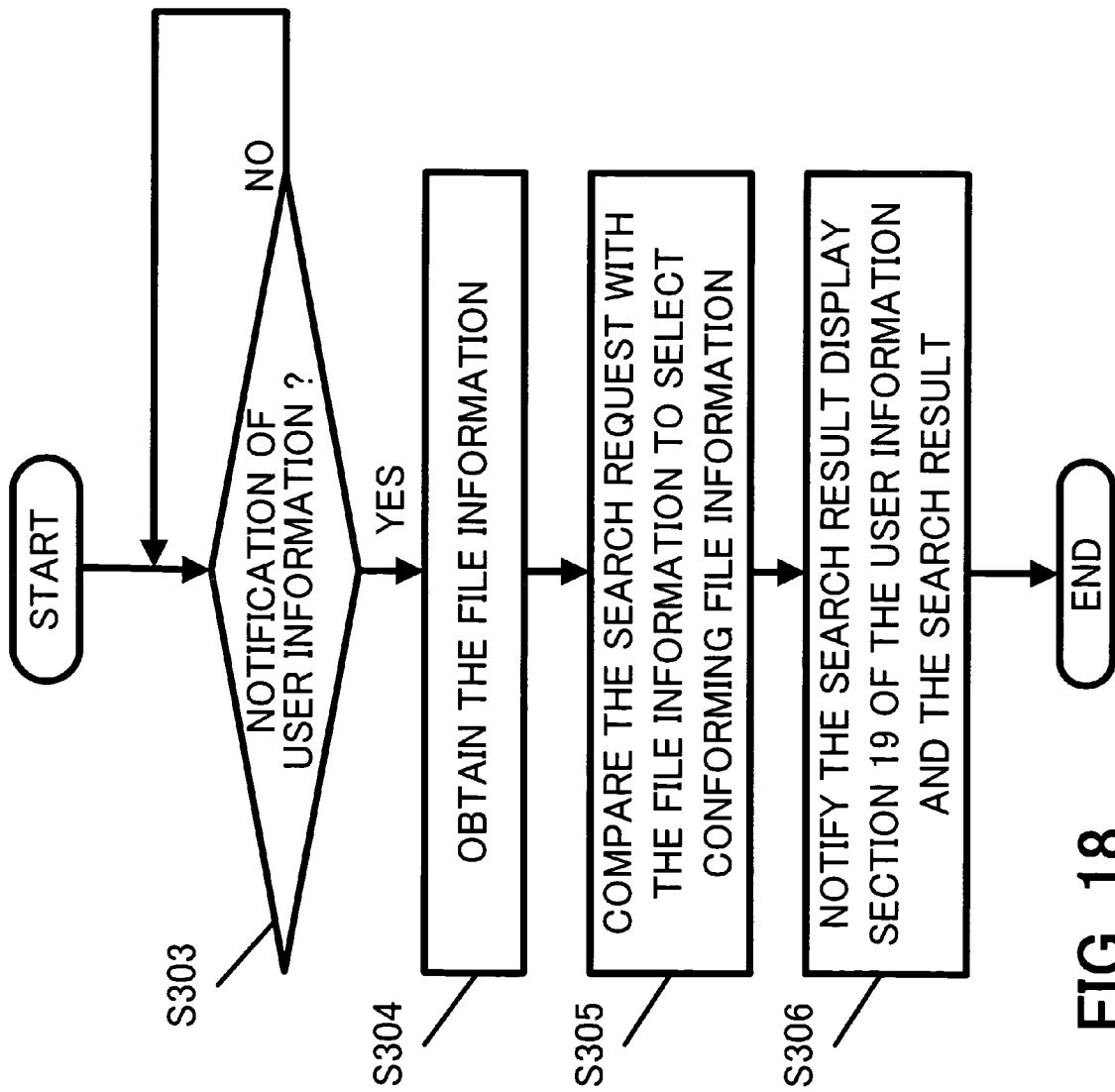
FIG. 18 is a flowchart showing a process of the search section.

A process of the search section 18 will be described with reference to FIG. 18.

In Step S303, the search section 18 judges whether or not there is a notification of the user information from the request section 17. When the judgment is YES, there is a notification of the user information, and the process shifts to Step S304. On the other hand, when the judgment is NO, the process returns to Step S303.

In Step S304, the search section 18 obtains the file information from the data management section 13, and the process shifts to Step S305.

In Step S305, the search section 18 compares the search request and the file information with each other to select conforming file information. Then, the process shifts to Step S306.

In Step S306, the search section 18 notifies the search result display section 19 of the user information and the search result obtained in Step S303. Then, the process is finished.

Figure 19:
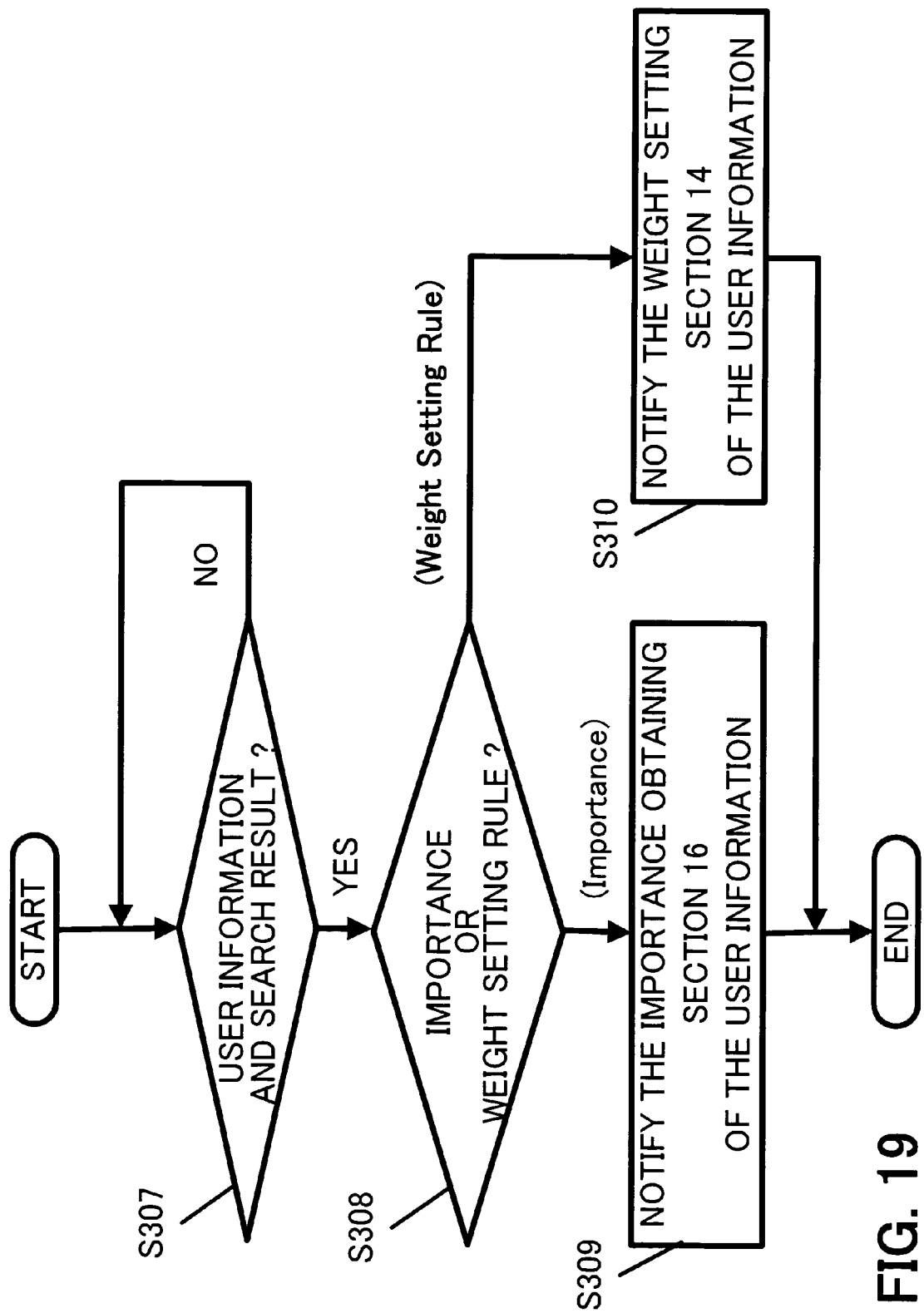
FIG. 19 is a flowchart showing a process of the search result display section.

A process of the search result display section 19 will be described with reference to FIG. 19.

In Step S307, the search result display section 19 judges whether or not there is a notification of the user information and the search result from the search section 18. When the judgment is YES, there is a notification of the user information and the like, and the process shifts to Step S308. On the other hand, when the judgment is NO, the process returns to Step S307.

In Step S308, the search result display section 19 judges whether the user uses the importance or the weight setting rule from the user information. When the user uses the importance, the process shifts to Step S309. On the other hand, when the user uses the weight setting rule, the process shifts to Step S310. Then, the process is finished.

In Step S309, the search result display section 19 notifies the importance obtaining section 16 of the user information. Then, the process is finished. As a result, the importance obtaining section 16 can obtain the importance associated with the user on the basis of the user information.

In Step S310, the search result display section 19 notifies the weight setting section 14 of the user information. Then, the process is finished. As a result, the weight setting section 14 can obtain the weight setting rule associated with the user on the basis of the user information.

Figure 20:
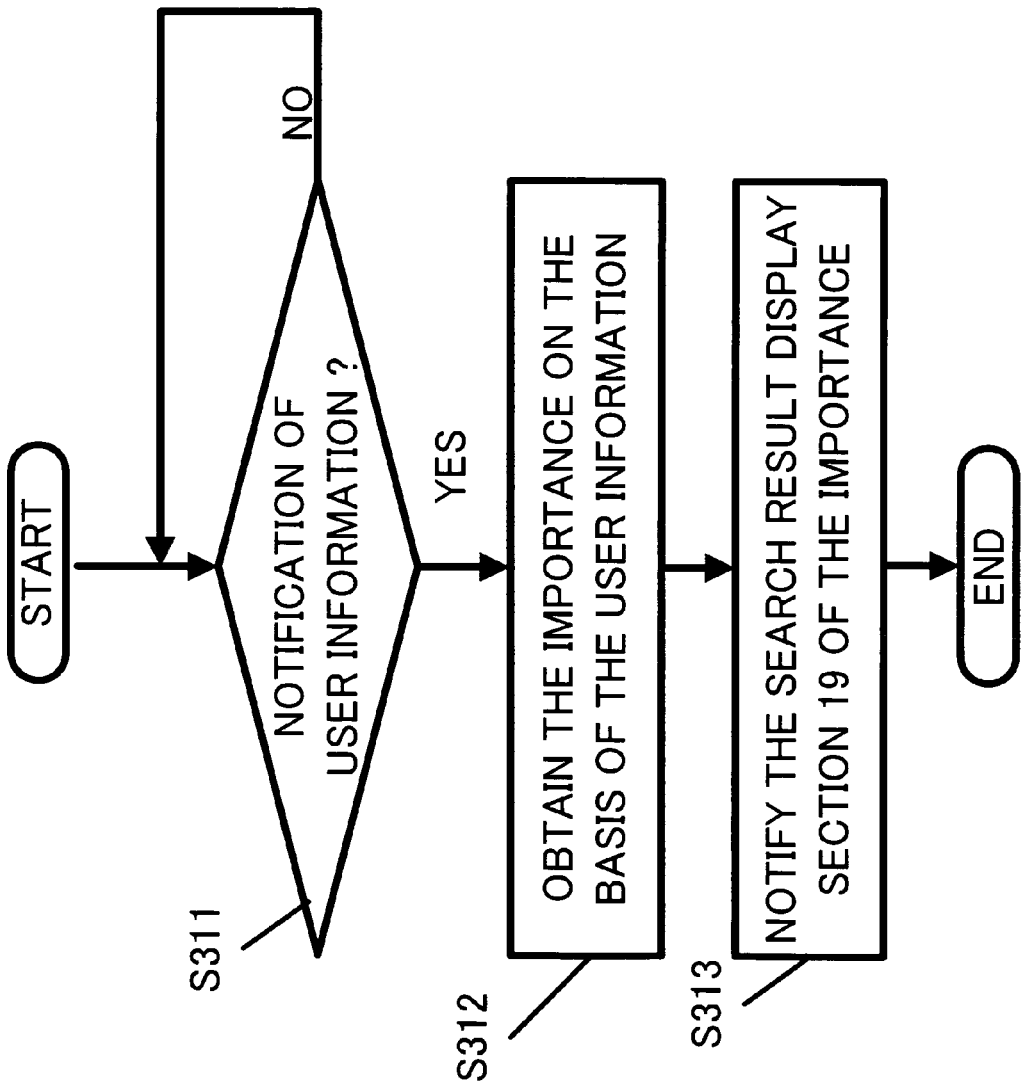
FIG. 20 is a flowchart showing a process of the importance obtaining section.

A process of the importance obtaining section 16 will be described with reference to FIG. 20.

In Step S311, the importance obtaining section 16 judges whether or not there is a notification of the user information from the search result display section 19. When the judgment is YES, there is a notification of the user information, and the process shifts to Step S312. On the other hand, when the judgment is NO, the process returns to Step S311.

In Step S312, the importance obtaining section 16 obtains the stored importance associated with the user on the basis of the user information from the data management section 13. The process shifts to Step S313.

In Step S313, the importance obtaining section 16 notifies the search result display section 19 of the importance obtained in Step S312. Then, the process is finished.

Figure 21:
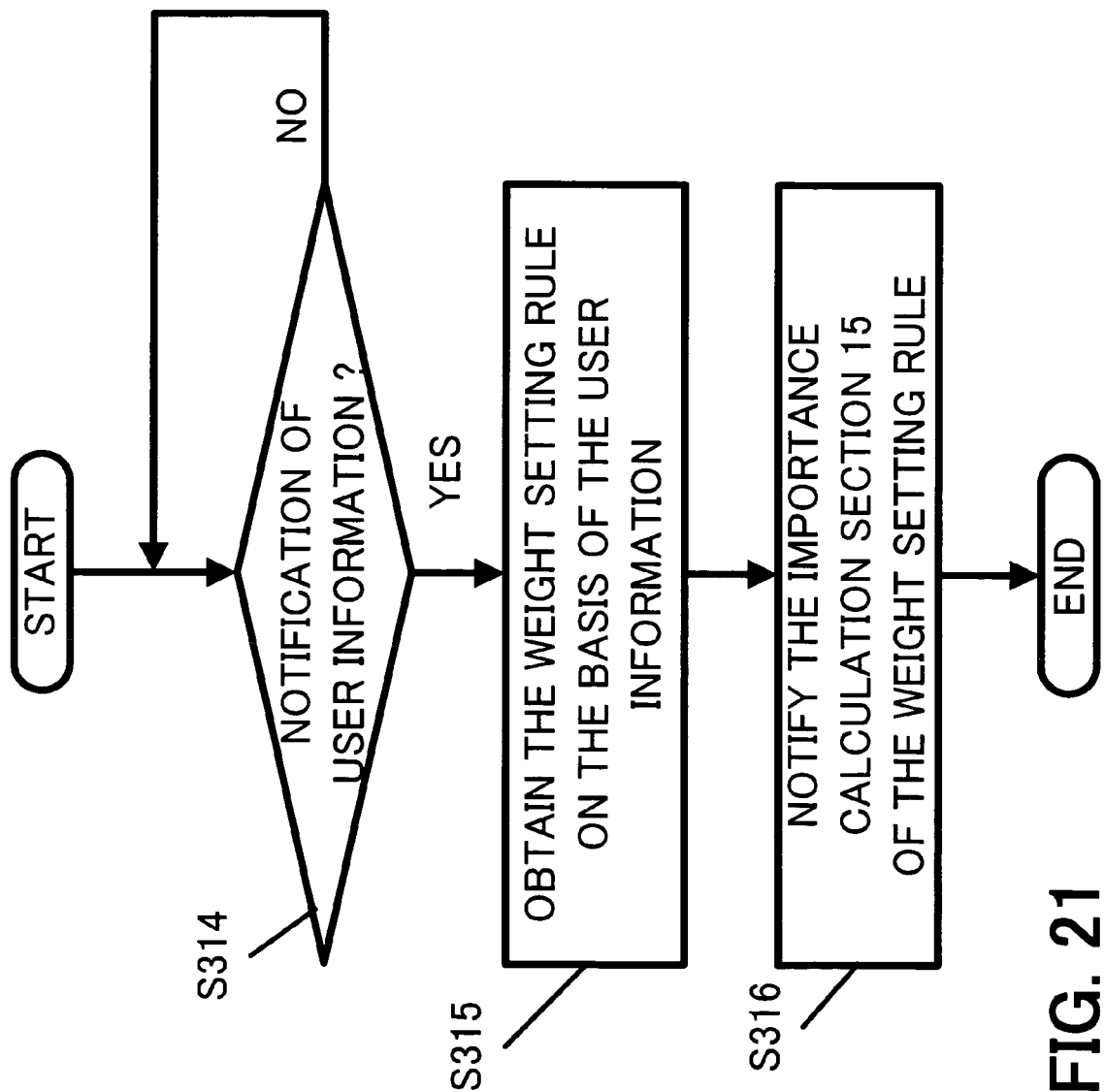
FIG. 21 is a flowchart showing a process of the weight setting section.

A process of the weight setting section 14 will be described with reference to FIG. 21.

In Step S314, the weight setting section 14 judges whether or not there is a notification of the user information from the search result display section 19. When the judgment is YES, there is a notification of the user information, and the process shifts to Step S315. On the other hand, when the judgment is NO, the process returns to Step S314.

In Step S315, the weight setting section 14 obtains the stored weight setting rule associated with the user on the basis of the user information from the data management section 13. The process shifts to Step S316.

In Step S316, the weight setting section 14 notifies the importance calculation section 15 of the weight setting rule obtained in Step S315. Then, the process is finished.

Figure 22:
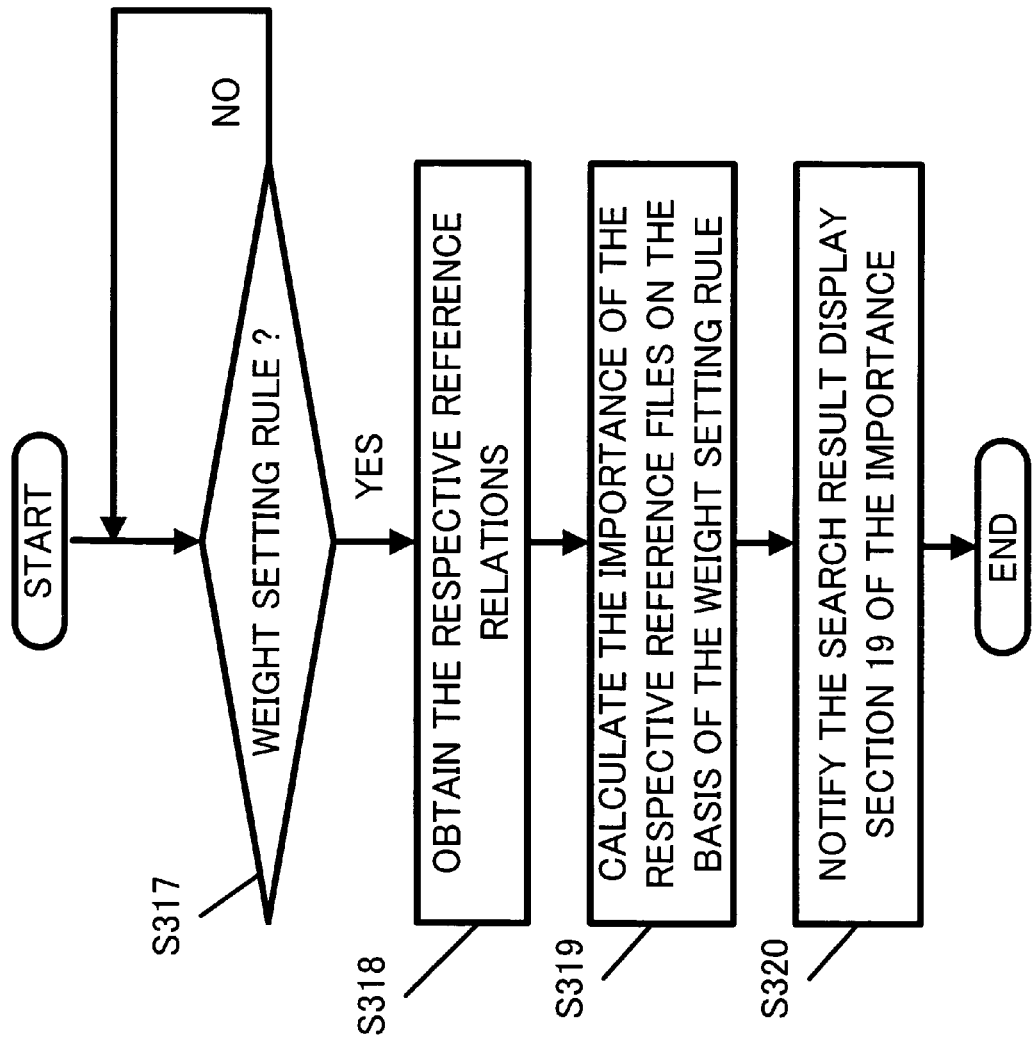
FIG. 22 is a flowchart showing a process of the importance calculation section.

A process of the importance calculation section 15 will be described with reference to FIG. 22.

In Step S317, the importance calculation section 15 judges whether or not there is a notification of the weight setting rule from the weight setting section 14. When the judgment is YES, there is a notification of the weight setting rule, and the process shifts to Step S318. On the other hand, when the judgment is NO, the process returns to Step S317.

In Step S318, the importance calculation section 15 obtains the respective reference relations from the data management section 13, and the process shifts to Step S319.

In Step S319, the importance calculation section 15 calculates the importance of the respective reference files on the basis of the weight setting rule notified in Step S317. The process shifts to Step S320.

In Step S320, the importance calculation section 15 notifies the search result display section 19 of the importance calculated in Step S319. Then, the process is finished.

Figure 23:
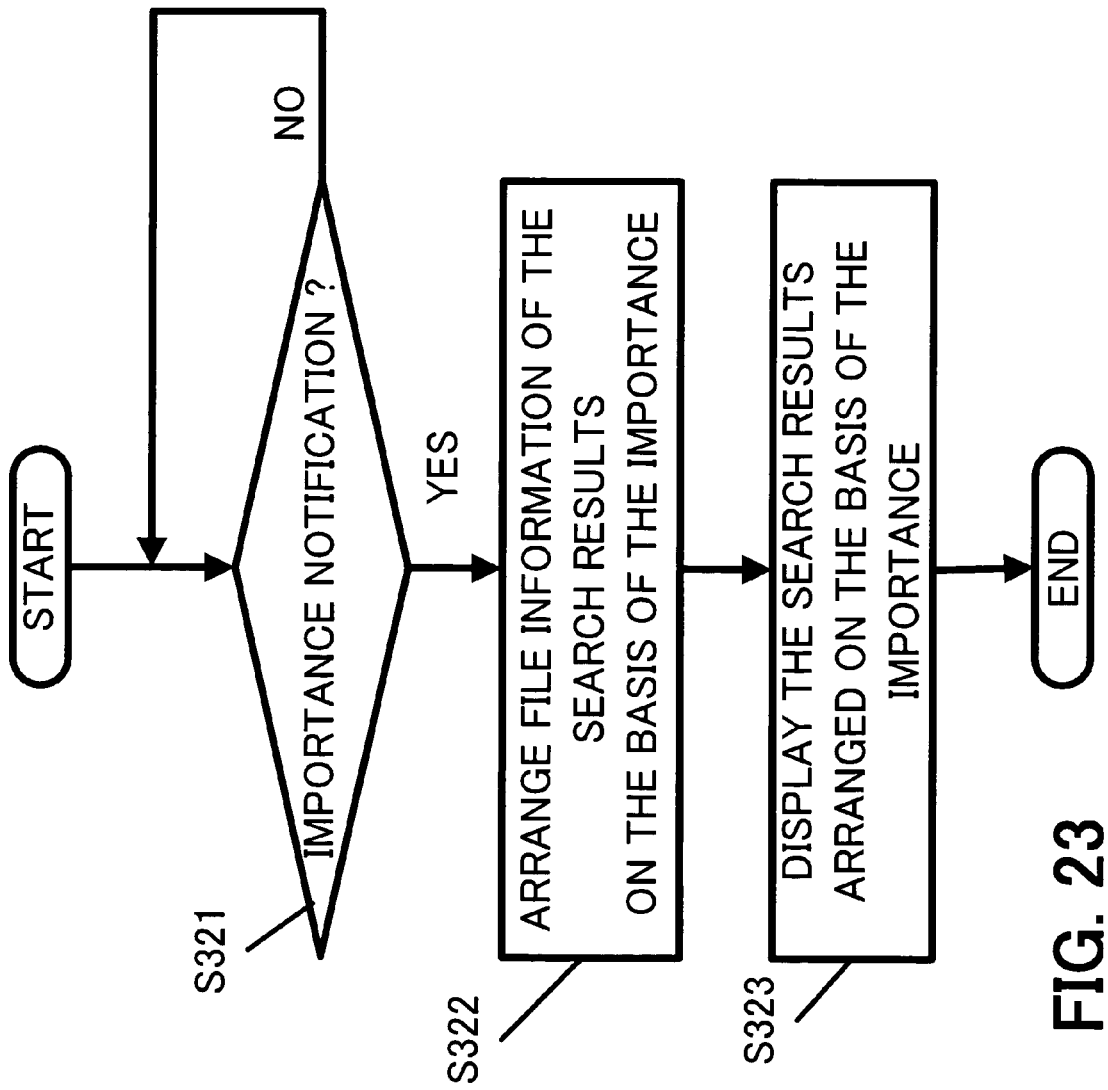
FIG. 23 is a flowchart showing a process of the search result display section.

A process of the search result display section 19 will be described with reference to FIG. 23.

In Step S321, the search result display section 19 judges whether or not there is a notification of the importance from the importance obtaining section 16. When the judgment is YES, there is a notification of the importance, and the process shifts to Step S322. On the other hand, when the judgment is NO, the process returns to Step S321.

In Step S322, the search result display section 19 arranges file information of the search results on the basis of the importance, and the process shifts to Step S323.

In Step S323, the search result display section 19 displays the search results arranged on the basis of the importance on the display section 2. Then, the process is finished.

Figure 24:
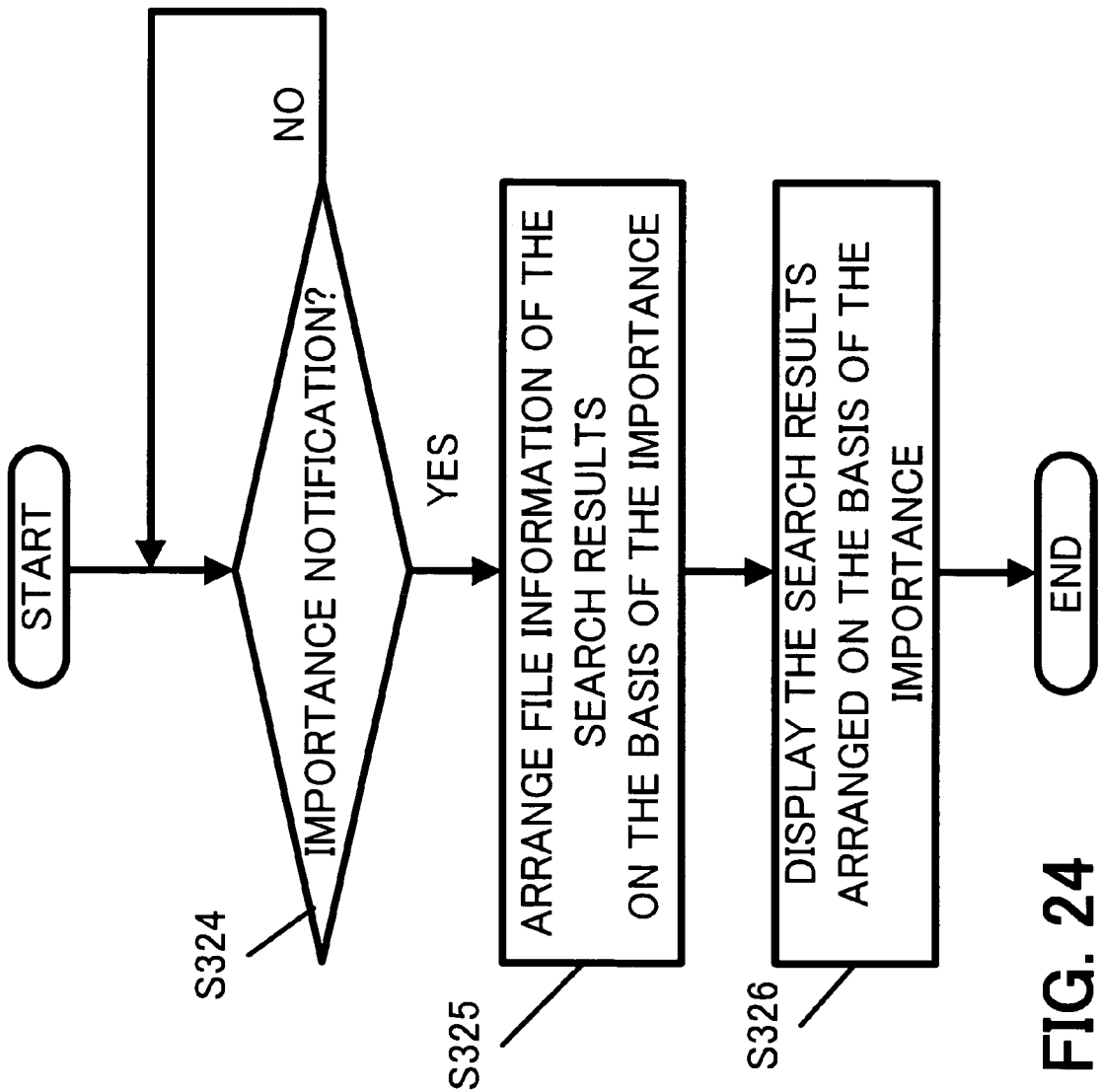
FIG. 24 is a flowchart showing a process of the search result display section.

A process of the search result display section 19 will be described with reference to FIG. 24.

In Step S324, the search result display section 19 judges whether or not there is a notification of the importance from the importance calculation section 15. When the judgment is YES, there is a notification of the importance, and the process shifts to Step S325. On the other hand, when the judgment is NO, the process returns to Step S324.

In Step S325, the search result display section 19 arranges the file information of the search results on the basis of the importance, and the process shifts to Step S326.

In Step S326, the search result display section 19 displays the search results arranged on the basis of the importance on the display section 2. Then, the process is finished.

Figure 31B:
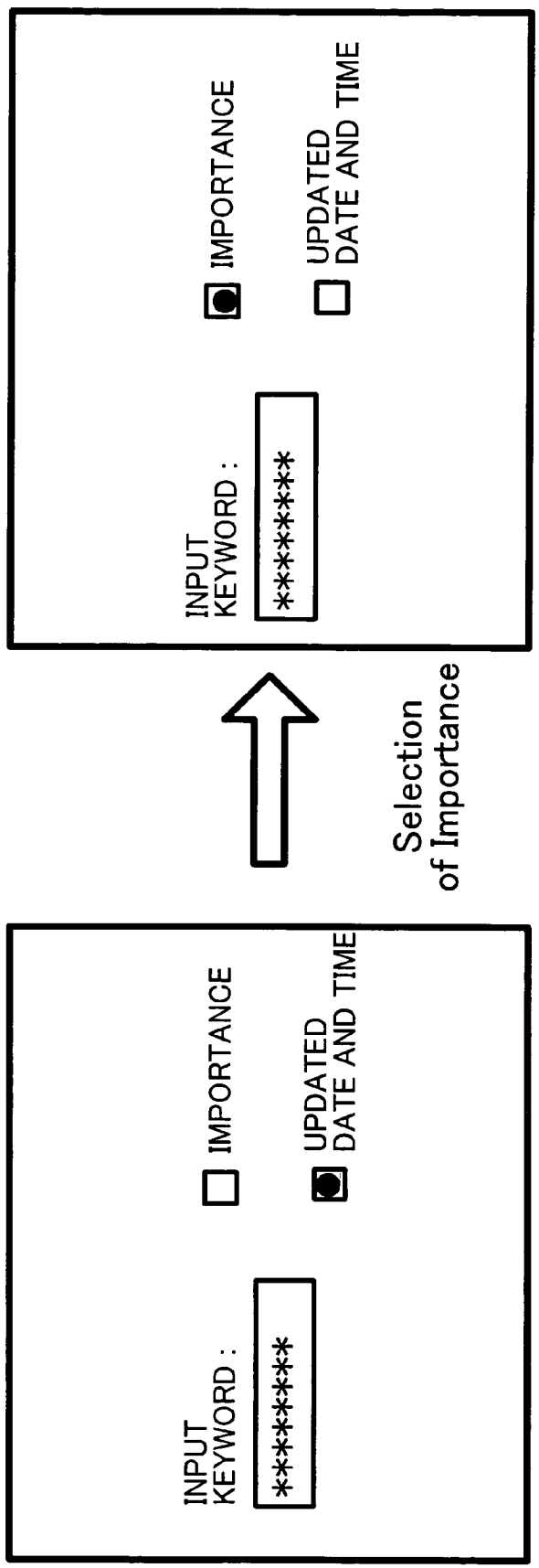

In addition, for example, as shown in FIG. 31B, it is also conceivable that the configuration may include displaying on the search condition setting display, a section in which a keyword to be used for the search is input and a check box for allowing the user to select the use of the importance or the use of the updated date and time of the file when the search results are arranged. In the initial status, a check box for the updated date and time is turned on. When the user desires to arrange the search results on the basis of the importance, a check box for the importance is turned on by the GUI operation. When the user does not desire to arrange the search results on the basis of the importance, the GUI operation is not performed on the check box, whereby the search results are arranged on the basis of the updated date and time. With this configuration, when the user makes the search request, it is possible to immediately select one of the ways of arranging the search results: on the basis of the importance or on the basis of the updated date and time.

Third Embodiment

According to the first and second embodiments, the importance is calculated in response to the user request, but it is also conceivable that the configuration may include calculating the importance each time the user performs a file operation.

With this configuration, it is possible to calculate the importance substantially in real time.

According to a third embodiment, in the process of the reference relation creation section 12 described with reference to FIG. 6, after the step (Step S006) of subjecting the obtained information to the association to be stored, the importance calculation section 15 is activated. As a result, it is possible to calculate the importance each time the user performs a file operation.

A process of the reference relation creation section 12 will be described with reference to FIG. 27.

In Step S401, the reference relation creation section 12 judges whether or not there is an activation notification from the file operation monitor section 11. When the judgment is YES, there is an activation notification, and the process shifts to Step S402. On the other hand, when the judgment is NO, the process returns to Step S401.

In Step S402, the reference relation creation section 12 obtains information necessary for a reference relation. Herein, the information necessary for the reference relation includes the reference source file, the importance of the reference source file, the reference file, the user who has performed the file operation, date and time when the file operation was performed, and the like. Then, the process shifts to Step S403.

In Step S403, the reference relation creation section 12 activates the importance calculation section 15. Then, the process is finished.

Figure 28:
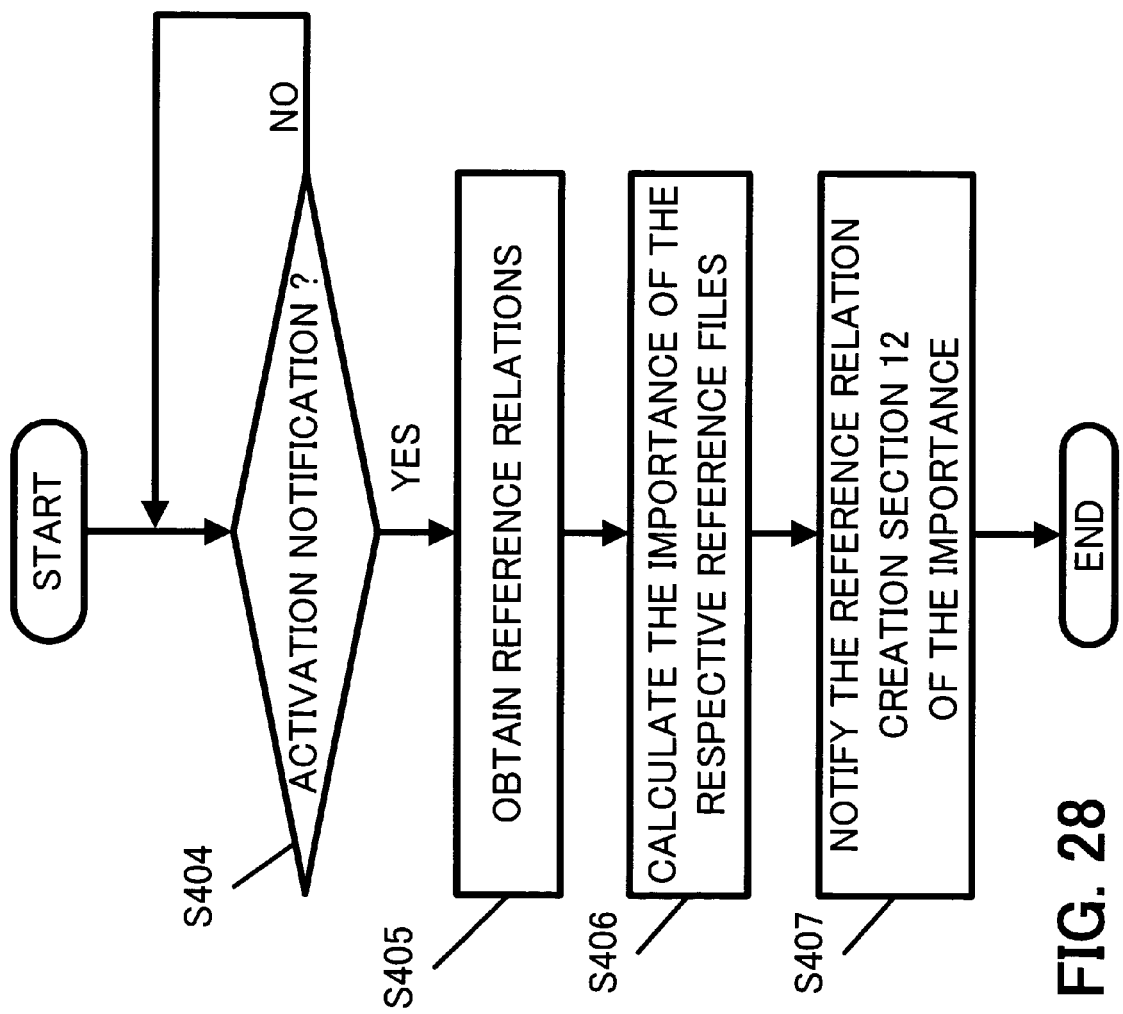
FIG. 28 is a flowchart showing a process of the importance calculation section.

A process of the importance calculation section 15 will be described with reference to FIG. 28.

In Step S404, the importance calculation section 15 judges whether or not there is an activation notification from the reference relation creation section 12. When the judgment is YES, there is an activation notification, and the process shifts to Step S405. On the other hand, when the judgment is NO, the process returns to Step S404.

In Step S405, the importance calculation section 15 obtains reference relations from the data management section 13. Then, the process shifts to Step S406.

In Step S406, the importance calculation section 15 calculates the importance of the respective reference files from the respective reference relations obtained in Step S405.

As will be described in Step S409, according to the third embodiment, the reference file and the importance are associated with each other as the reference relation data. Examples of the data stored as the reference relation are shown in FIG. 3B. This example is the same as that described in FIG. 3A according to the first embodiment, except that the importance of the reference source file is subjected to the association to be stored. The method of calculating the importance includes adding 5% of the importance of the reference source file to the importance of the reference file. With this configuration, it is possible to increase the importance of the file that is referenced by a file with high importance. The method of calculating the importance has the same configuration as that described in the first embodiment except that the importance of the reference source file is used. From a reference relation 75, it is understood that copy and paste from the file B to the file A is performed 3 times, so 10×3=30 points are added to the file B. The reference time is 4 minutes and 32 seconds, which is longer than the predetermined value, so 3 points are added. Moreover, as the importance of the reference source file A is 24, 5% of this importance, that is, 1.2 points, is further added. As the result of the operations by the user A, total 34.2 points are added to the file B. From a reference relation 76, it is understood that copy and paste is performed 3 times and the reference time is 3 minutes and 53 seconds, which is longer than the predetermined value, so 10×3+3=33 points are added. Moreover, as the importance of the file A is 69, 5% of this importance, that is, 3.45 points, is further added. As the result of the operations by the user F, total 36.5 points are added to the file C. From a reference relation 77, it is understood that 10×4+3=43 points are added to the file D. Moreover, as the importance of the file B is 326, 5% of this importance, that is, 16.3 points, is further added. As the result of the operations by a user I, total 59.3 points are added to the file D.

In Step S407, the importance calculation section 15 notifies the reference relation creation section 12 of the importance calculated in Step S406. Then, the process is finished.

Figure 29:
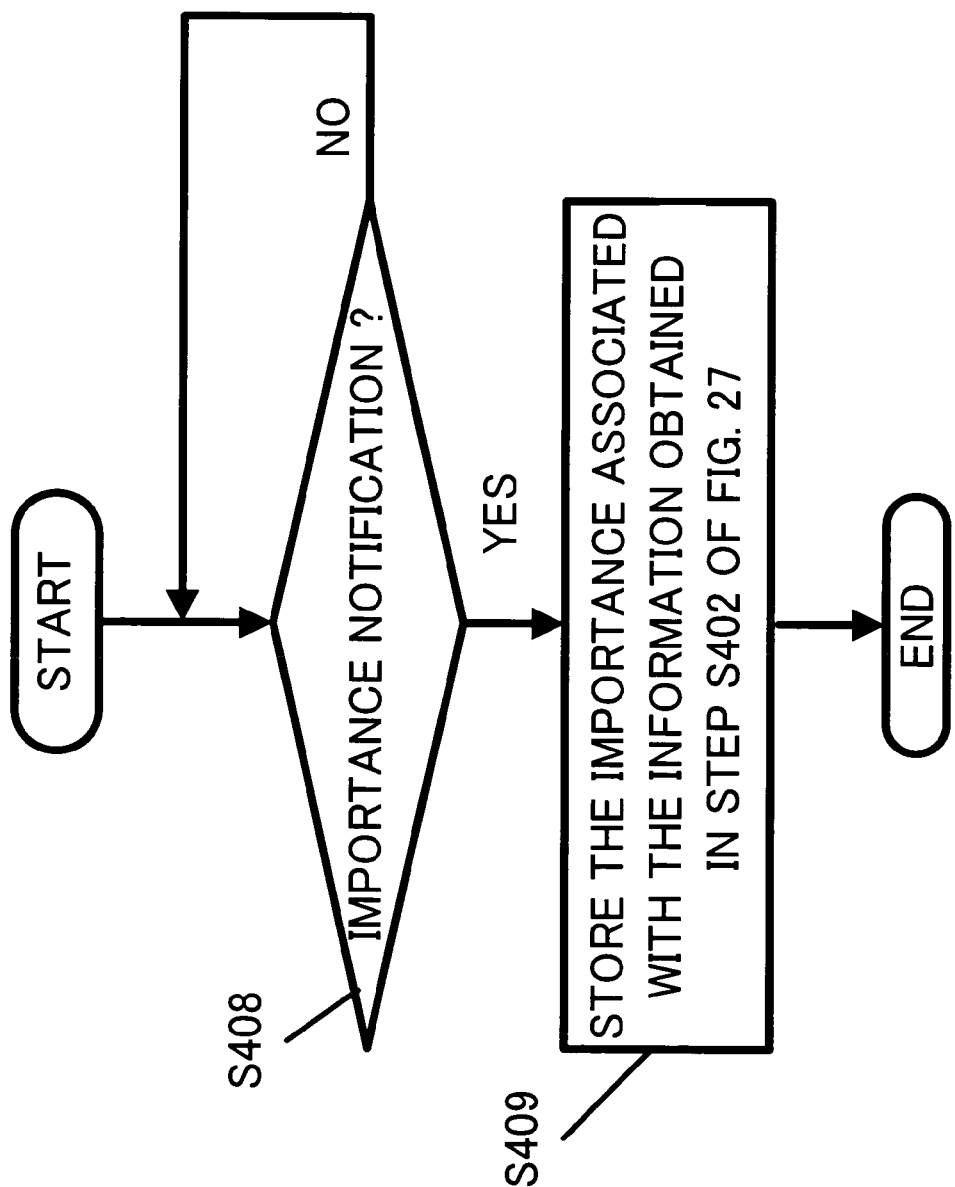
FIG. 29 is a flowchart showing a process of the reference relation creation section.

A process of the reference relation creation section 12 will be described with reference to FIG. 29.

In Step S408, the reference relation creation section 12 judges whether or not there is an importance notification from the importance calculation section 15. When the judgment is YES, there is an importance notification, and the process shifts to Step S409. On the other hand, when the judgment is NO, the process returns to Step S408.

Figure 27:
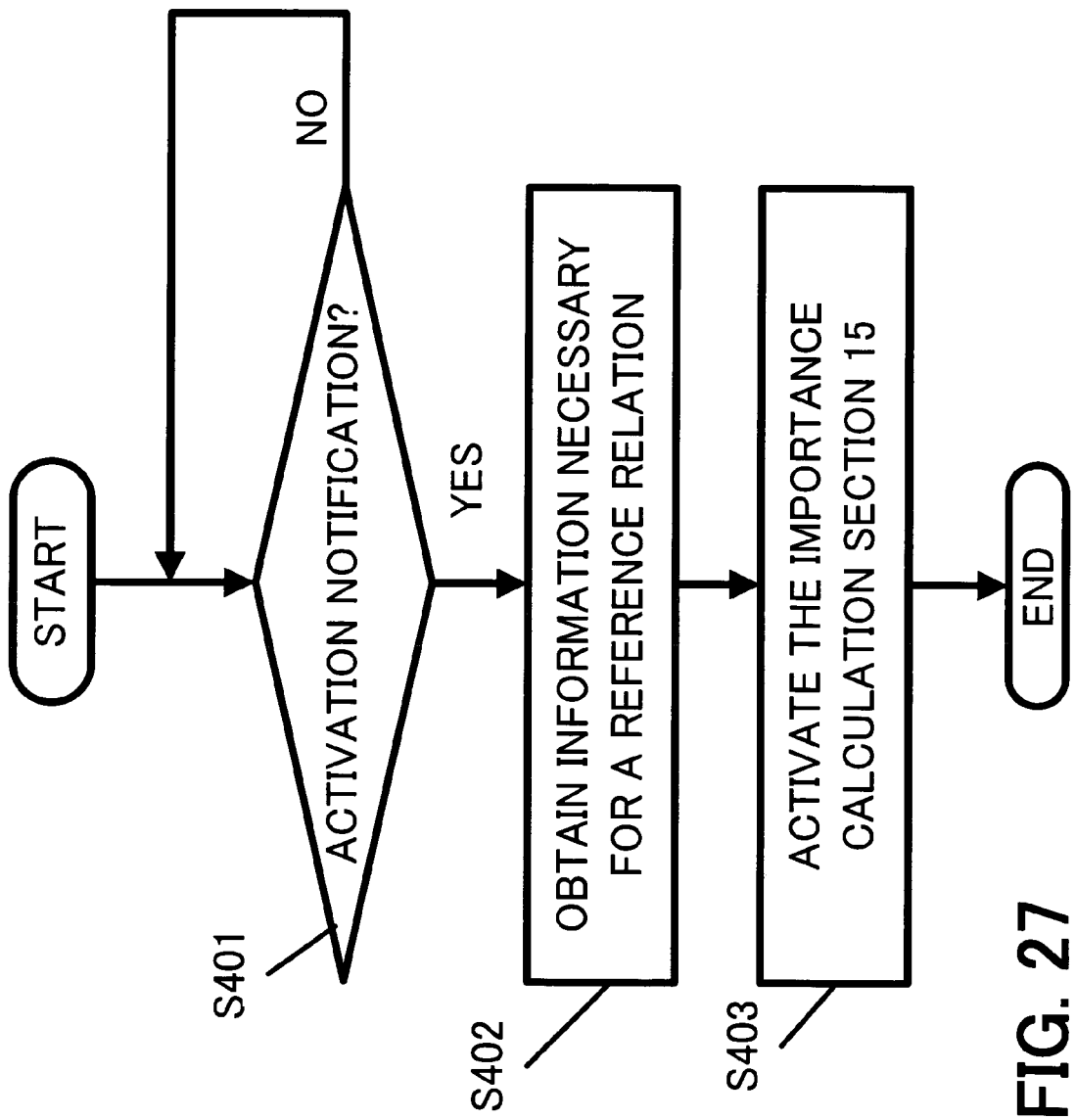
FIG. 27 is a flowchart showing a process of the reference relation creation section.

In Step S409, the reference relation creation section 12 performs association between the importance notified in Step S408 and the information obtained in Step S402 of FIG. 27 and stores the importance and the information in the data management section 13 as the reference relation. Then, the process is finished.

By performing the association of the importance of the reference source file as well for the storage, the calculation of the importance described in Step S406 can be performed with use of the real time importance of the reference source file.

The above-mentioned embodiments are specifically described for better understanding of the present invention and are not construed to limit other embodiment. Therefore, various changes may be made without departing from the scope of the invention. For example, when files in a folder are arranged, such a configuration may also be adopted to arrange the files on the basis of the importance.

What is claimed is:

1. A file search system for searching for a file stored in a storage device, comprising:
   reception means for receiving a search request made by a user;
   search means for obtaining search result files by searching the storage device on the basis of notification from the reception means;
   monitor means for monitoring a file operation by the user;
   creation means for creating a reference relation of the search result files on the basis of the file operation by the user monitored by the monitor means, the reference relation being defined as a relation between a reference file and a reference source file in which information included in the reference file is introduced into the reference source file by the file operation of the user, wherein the reference file is a file to be referenced and the reference source file is a file referencing the reference file, and the introduction of information from the reference file to the reference source file is performed by copying information from the reference file and pasting the copied information into the reference source file;
   storage means for storing the reference relation;
   importance calculation means for calculating an importance of the reference file on the basis of one or more items selected from among reference relation items each obtained by monitoring a file operation of the user regarding introduction of information from the reference file to the reference source file; and search result sort means for arranging the search result files obtained by the search means on the basis of the importance of the reference file; and a control section for displaying a screen for allowing the user to select arrangement of the search result files obtained by the search means on the basis of the importance or a condition other than the importance, the control section judging whether or not the user selects the arrangement of the search result files on the basis of the importance;

wherein the search result sort means arranges the search result files on the basis of the importance when the arrangement of the search result files on the basis of the importance is selected, and arranges the search result files on the basis of the condition other than the importance when the arrangement of the search result files on the basis of the importance is not selected.

2. The file search system according to claim 1, further comprising weight setting means for setting a weight of the reference relation, to one or more items selected from among the reference relation items, wherein the importance calculation means calculates the importance of the file on the basis of the weight set by the weight setting means.

3. The file search system according to claim 1, further comprising weight setting rule obtaining means for obtaining a weight setting rule for setting a weight of the reference relation, wherein:
the storage means further stores the weight setting rule; and
the importance calculation means calculates the importance of the file on the basis of the weight setting rule obtained by the weight setting means.

4. The file search system according to claim 1, further comprising:
weight setting rule obtaining means for obtaining a weight setting rule for setting a weight of the reference relation;
identification means for identifying the user; and
recording means for recording the weight setting rule in association with each user,
wherein the importance calculation means calculates the importance on the basis of the weight setting rule associated with the user who has made the search request.

5. The file search system according to claim 1, further comprising:
importance obtaining means for obtaining the importance;
identification means for identifying the user; and
recording means for recording the importance in association with each user,
wherein the search result sort means arranges the search result files obtained by the search means on the basis of the importance associated with the user who has made the search request.

6. A file search method of searching for a file stored in a storage device, comprising:
receiving a search request made by a user;
obtaining search result files by searching the storage device on the basis of the search request;
monitoring a file operation by the user;
creating a reference relation between the search result files on the basis of the result of monitoring the file operation, the reference relation being defined as a relation between a reference file and a reference source file in which information included in the reference file is introduced into the reference source file by the file operation of the user, wherein the reference file is a file to be referenced and the reference source file is a file referencing the reference file, and the introduction of information from the reference file to the reference source file is performed by copying information from the reference file and pasting the copied information into the reference source file;

storing the reference relation;
calculating an importance of the reference file on the basis of one or more items selected from among reference relation items each obtained by monitoring a file operation of the user regarding introduction of information from the reference file to the reference source file;
arranging the search result files on the basis of the importance of the reference file;
displaying a screen for allowing the user to select arrangement of the search result files on the basis of the importance or a condition other than the importance;
judging whether or not the user selects the arrangement of the search result files on the basis of the importance; and
arranging the search result files on the basis of the importance when the arrangement of the search result files on the basis of the importance is selected, and arranging the search result files on the basis of the condition other than the importance when the arrangement of the search result files on the basis of the importance is not selected.

7. The file search method according to claim 6, further comprising:
setting a weight of the reference relation, to one or more items selected from among the reference relation items; and
calculating the importance of the reference file on the basis of the weight set in the weight setting step.

8. The file search method according to claim 6, further comprising:
obtaining a weight setting rule for setting a weight of the reference relation; and
calculating the importance of the file on the basis of the weight setting rule.

9. The file search method according to claim 6, further comprising:
obtaining a weight setting rule for setting a weight of the reference relation;
identifying the user;
recording the weight setting rule in association with each user; and
calculating the importance on the basis of the weight setting rule associated with the user who has made the search request.

10. The file search method according to claim 6, further comprising:
obtaining the importance; identifying the user;
recording the importance in association with each user; and
arranging the search result files on the basis of the importance associated with the user who has made the search request.

11. A computer readable medium storing a file search program causing a computer to perform a process comprising:
receiving a search request made by a user;
obtaining search result files by searching the storage device on the basis of the search request;
monitoring a file operation by the user;
creating a reference relation between the search result files on the basis of the result of monitoring the file operation, the reference relation being defined as a relation between a reference file and a reference source file in which information included in the reference file is introduced into the reference source file by the file operation of the user, wherein the reference file is a file to be referenced and the reference source file is a file referencing the reference file, and the introduction of information from the reference file to the reference source file is performed by copying information from the reference file and pasting the copied information into the reference source file;

storing the reference relation;

calculating an importance of the reference file on the basis of one or more items selected from among reference relation items each obtained by monitoring a file operation of the user regarding introduction of information from the reference file to the reference source file;

arranging the search result files on the basis of the importance of the reference file, displaying a screen for allowing the user to select arrangement of the search result files on the basis of the importance or a condition other than the importance;

judging whether or not the user selects the arrangement of the search result files on the basis of the importance; and arranging the search result files on the basis of the importance when the arrangement of the search result files on the basis of the importance is selected, and arranging the search result files on the basis of the condition other than the importance when the arrangement of the search result files on the basis of the importance is not selected.

12. The computer readable medium storing a file search program according to claim 11, wherein the process further comprises:

setting a weight of the reference relation, to one or more items selected from among the reference relation items; and calculating the importance of the reference file on the basis of the weight set in the weight setting step.

13. The computer readable medium storing a file search program according to claim 11, wherein the process further comprises:

obtaining a weight setting rule for setting a weight of the reference relation; and calculating the importance of the file on the basis of the weight setting rule.

14. The computer readable medium storing a file search program according to claim 11, wherein the process further comprises:

obtaining a weight setting rule for setting a weight of the reference relation;

identifying the user;

recording the weight setting rule in association with each user; and calculating the importance on the basis of the weight setting rule associated with the user who has made the search request.

15. The computer readable medium storing a file search program according to claim 11, wherein the process further comprises:

obtaining the importance;

identifying the user;

recording the importance in association with each user; and arranging the search result files on the basis of the importance associated with the user who has made the search request.

* * * * *

UNITED STATES PATENT AND TRADEMARK OFFICE
CERTIFICATE OF CORRECTION

| | | |
|---|---|---|
| PATENT NO. | : 7,747,616 B2 | Page 1 of 1 |
| APPLICATION NO. | : 11/477623 | |
| DATED | : June 29, 2010 | |
| INVENTOR(S) | : Shigefumi Yamada et al. | |

It is certified that error appears in the above-identified patent and that said Letters Patent is hereby corrected as shown below:

Column 17, Line 22 delete "the file" and insert --the reference file--.

Column 17, Line 38 delete "each" and insert --the--.

Column 17, Line 47 delete "each" and insert --the--.

Column 18, Line 41 delete "each" and insert --the--.

Column 20, Line 16 delete "each" and insert --the--.

Column 20, Line 26 delete "each" and insert --the--.

Signed and Sealed this
Fourth Day of January, 2011

David J. Kappos
*Director of the United States Patent and Trademark Office*